United States Patent
Kojo

(10) Patent No.: US 9,333,434 B2
(45) Date of Patent: May 10, 2016

(54) COLLABORATIVE NETWORK GAME USING PLAYER RANKINGS

(71) Applicant: DeNA Co., Ltd., Tokyo (JP)

(72) Inventor: Taku Kojo, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 163 days.

(21) Appl. No.: 14/204,908

(22) Filed: Mar. 11, 2014

(65) Prior Publication Data

US 2014/0274381 A1    Sep. 18, 2014

(30) Foreign Application Priority Data

Mar. 12, 2013    (JP) ................................ 2013-048760

(51) Int. Cl.
*A63F 9/24*        (2006.01)
*A63F 13/87*       (2014.01)
*A63F 13/798*      (2014.01)
*A63F 13/795*      (2014.01)
*A63F 13/332*      (2014.01)

(52) U.S. Cl.
CPC .............. *A63F 13/87* (2014.09); *A63F 13/798* (2014.09); *A63F 13/332* (2014.09); *A63F 13/795* (2014.09)

(58) Field of Classification Search
CPC ... A63F 13/12; A63F 2300/407; A63F 13/69; A63F 2300/558; A63F 13/87
See application file for complete search history.

(56) References Cited

U.S. PATENT DOCUMENTS

| 2003/0228908 A1* | 12/2003 | Caiafa | A63F 13/12 463/42 |
| 2007/0087797 A1* | 4/2007 | Van Luchene | A63F 13/12 463/1 |
| 2007/0087799 A1* | 4/2007 | Van Luchene | A63F 13/12 463/1 |
| 2007/0265043 A1* | 11/2007 | Wang | A63F 13/12 463/2 |
| 2009/0069091 A1* | 3/2009 | Yamamoto | A63F 13/12 463/42 |
| 2013/0210511 A1* | 8/2013 | LaRocca | G07F 17/32 463/12 |

FOREIGN PATENT DOCUMENTS

| JP | 2005-253724 B | 9/2005 |
| JP | 2006-192142 B | 7/2006 |
| JP | 2008-167824 B | 7/2008 |

OTHER PUBLICATIONS

Japanese Patent Application No. 2013-048760 of Office Action mailed on Dec. 16, 2013.
Monster Hunter Frontier Online, Weekly Famitsu, Kadokawa Corporation Enterbrain Brand Company, Jan. 6, 2011, vol. 26 No. 4, pp. 68-70, particularly see the column titled "Compete for Hunting Techniques! Shuryo Waza (Hunting Skill) Quest", in the upper portion of p. 70.

* cited by examiner

*Primary Examiner* — Steve Rowland
(74) *Attorney, Agent, or Firm* — Procopio, Cory, Hargreaves & Savitch LLP

(57) ABSTRACT

The server device periodically calculates a contribution degree to a network game as an active level for each participating user during progress of the network game, so that a ranking for each user is determined and displayed. Furthermore, the server device adjusts a parameter for each participating user in accordance with the ranking determined during progress of the game.

7 Claims, 19 Drawing Sheets

FIG. 3

USER MANAGEMENT DATA

| USER NAME | USER IDENTIFICATION INFORMATION | LEVEL | PROGRESS INFORMATION | OWNED CARD IDENTIFICATION INFORMATION |
|---|---|---|---|---|
| P1 | P001 | 10 | STAGE 2 | C001, C003 |
| P2 | P002 | 14 | STAGE 3 | C001, C003, C006 |
| P3 | P003 | 20 | STAGE 5 | C001, C005, C007, C009 |
| P4 | P004 | 3 | STAGE 1 | C002 |
| ⋮ | ⋮ | ⋮ | ⋮ | ⋮ |

FIG. 4

CARD MANAGEMENT DATA

| CARD IDENTIFICATION INFORMATION | TITLE | RARITY VALUE | INITIAL ATTACK VALUE | HIT POINT VALUE | | ATTRIBUTE VALUE | |
|---|---|---|---|---|---|---|---|
| C001 | KNIGHT A | UNCOMMON | 15 | 40 | | LIGHT | ⋮ |
| C002 | KNIGHT B | COMMON | 10 | 35 | | WATER | ⋮ |
| C003 | KNIGHT C | UNCOMMON | 20 | 35 | ⋮ | FIRE | ⋮ |
| C004 | SAMURAI A | RARE | 120 | 70 | | EARTH | ⋮ |
| C005 | SAMURAI B | UNCOMMON | 70 | 50 | ⋮ | EARTH | ⋮ |
| C006 | NINJA A | RARE | 100 | 50 | | DARK | ⋮ |
| C007 | NINJA B | UNCOMMON | 35 | 20 | ⋮ | WATER | ⋮ |
| C008 | MAGE A | UNCOMMON | 30 | 20 | ⋮ | FIRE | |
| C009 | MAGE B | COMMON | 20 | 10 | ⋮ | WATER | ⋮ |
| C0010 | MONK | SUPER RARE | 150 | 200 | ⋮ | EARTH | ⋮ |
| ⋮ | ⋮ | ⋮ | ⋮ | ⋮ | | ⋮ | ⋮ |
| ⋮ | ⋮ | ⋮ | ⋮ | ⋮ | | ⋮ | ⋮ |
| ⋮ | ⋮ | ⋮ | ⋮ | ⋮ | | ⋮ | ⋮ |

COLLABORATIVE NETWORK GAME USING PLAYER RANKINGS

CROSS-REFERENCE TO RELATED APPLICATIONS

The present application claims priority under 35 USC 119 from Japanese Patent Application No. 2013-048760, filed Mar. 12, 2013, the contents of which is incorporated by reference in its entirety.

BACKGROUND OF THE INVENTION

1. Field of the Invention

The present invention relates to a processing technology for a social game in which a plurality of users participate through a network.

2. Description of Related Art

In recent years, a social game in which a plurality of users participate through a network using an SNS (Social Networking Service) is widespread. A network game in which information processing apparatuses such as PC (Personal Computer) terminals and portable terminals are used to communicate with a game server so that information is exchanged among users to facilitate communication with each other is provided.

In a so-called network match game, among such a network game, for example, users perform a battle against each other; or users form a team with each other to perform a battle against an opponent team or a virtual enemy. For example, JP 2006-192142 A discloses a network ranking system that performs ranking processing based on game scores of players who participate in such a match-type network game.

SUMMARY OF THE INVENTION

However, while such a ranking is linked to a predetermined bonus given when a network game is terminated, participating users are not able to check the ranking until the network game is terminated. Accordingly, there has been a problem that the participating users do not know how much degree is still needed to increase the ranking. As a result, strategic elements of the game itself are significantly inhibited, and therefore the network game becomes unlikely to be exited. There has been concern that an increase of such hardly-exciting network games may threaten the future of the flourishing network game industry.

The present invention has been made in view of such a problem, and an object of the present invention is to provide a server device, a method, and a non-transitory computer-readable storage medium storing game program which can further improve amusement by appropriately presenting a ranking to participating users even during progress of a network game.

An aspect of the present invention relates to a server device. The server device includes: a game management unit that manages progress of a network game in which a plurality of users is allowed to participate through communication lines; a ranking processing unit that calculates a contribution degree to the network game as an active level for each participating user during progress of the network game managed by the game management unit to determine a ranking; a display control unit that allows the participating user to be displayed in accordance with the ranking determined by the ranking processing unit; and a parameter adjustment unit that adjusts a user parameter stored for each participating user in accordance with the ranking determined by the ranking processing unit when the network game is terminated, so as to become advantageous in terms of game progress in the next and subsequent network games.

According to such an aspect, by calculating the contribution degree to a network game as an active level for each participating user during progress of the network game and determining a ranking, the ranking can be appropriately presented to the participating user even during progress of the network game. Accordingly, since the user can recognize how much degree is still needed to increase the ranking, the game can be strategically progressed. Thus, the network game can become more exited, thereby contributing to the development of the network game industry.

The ranking processing unit may also determine a ranking at a periodical or predetermined timing, as the network game progresses.

According to such an aspect, by determining a ranking at a periodical or predetermined timing, the ranking is changed periodically or in response to an event in the game. Therefore, a real-time ranking change can be presented to the game participating user at a more appropriate timing, improving excitement of the game.

The parameter adjustment unit may also adjust a parameter for each participating user in accordance with the ranking determined during progress of the network game so that the network game can be advantageously progressed.

According to such an aspect, by adjusting the parameter for each participating user in accordance with the ranking so that the network game can be advantageously progressed, amusement of the network game can be more improved.

The parameter adjustment unit may also adjust the parameter so that when the ranking during progress of the network game is lower, the network game can be progressed more advantageously.

According to such an aspect, by adjusting the parameter so that when the ranking during progress of the network game is lower, the network game can be progressed more advantageously, reversal of the ranking can be facilitated. Accordingly, since a tactical element between the users is strengthened, amusement of the network game can be more improved.

The ranking processing unit may also calculate an active level based on at least one of the number of predetermined instructions from a user to a network game, or the degree of an action which has promoted the progress of the game.

According to such an aspect, by calculating the active level based on at least one of the number of predetermined instructions from a user to a network game, or the degree of an action which has promoted the progress of a game, the user can be more involved in the network game, or the ranking for the user who has contributed to the network game can be improved. Therefore, excitement of the network game can be improved.

Furthermore, the game management unit may include: a receiving unit that, in a team formed by users having collaborative relationships with each other among users participating in a network game, receives an instruction action for the same objective from the users belonging to the team for a predetermined limited time; and an excitement level processing unit that calculates an excitement level based on a total amount of the instruction actions received by the receiving unit from each user within the same team. Here, the game management unit may progress the network game depending on the excitement level calculated by the excitement level processing unit.

According to such an aspect, by allowing the network game to progress depending on the excitement level calculated based on the total amount of the instruction actions from each user within the same team, solidarity in the team can be improved while desires of the participating users to contribute to the team can be increased. Therefore, excitement of the network game can be enhanced.

Furthermore, the display control unit may allow the total amount of the instruction actions received by the receiving unit for a predetermined limited time to be displayed for each user.

According to such an aspect, by allowing the total amount of the instruction actions received for a predetermined limited time to be displayed for each user, a desire to make a contribution more than other users can be promoted for each participating user. Accordingly, excitement of the network game can be enhanced.

Furthermore, another aspect of the present invention is a method. This method includes: managing progress of a network game in which a plurality of users is allowed to participate through communication lines; calculating a contribution degree to the network game as an active level for each participating user during progress of the network game to determine a ranking; displaying the participating user in accordance with the determined ranking; adjusting a user parameter stored for each participating user in accordance with the ranking when the network game is terminated, so as to become advantageous in terms of game progress in the next and subsequent network games.

Furthermore, another aspect of the present invention is a non-transitory computer-readable storage medium storing game program. This non-transitory computer-readable storage medium storing game program is a program causing a computer to execute: managing progress of a network game in which a plurality of users is allowed to participate through communication lines; calculating a contribution degree to the network game as an active level for each participating user during progress of the network game to determine a ranking; displaying the participating user in accordance with the determined ranking; adjusting a user parameter stored for each participating user in accordance with the ranking when the network game is terminated, so as to become advantageous in terms of game progress in the next and subsequent network games.

It should be noted that any combination of the above-described constituent elements as well as any conversion of the expression in the present invention among a method, a device, a system, a computer program and others are also effective as an aspect of the present invention.

According to the present invention, by appropriately presenting a ranking to participating users at appropriate times also during progress of a network game, amusement for a plurality of users participating in the game can be enhanced.

BRIEF DESCRIPTION OF THE DRAWINGS

FIG. 3 is a diagram illustrating an example of user management data managed in a user information management unit in FIG. 2;

FIG. 4 is a diagram illustrating an example of card management data managed in the user information management unit in FIG. 2;

DETAILED DESCRIPTION OF THE INVENTION

Before explaining examples of the present invention, outlines of the present invention will be described first. The present invention relates to ranking processing for determining relative rankings among participating users in a network game performed by a plurality of users through a network.

In the conventional ranking processing, rankings were calculated when a game was terminated, and then presented to participating users. Based on this ranking result, incentives such as bonus points and items, which can be used during the game, were provided to each participating user. However, since the rankings were not be able to be checked during game play, there has been a problem that, for example, in spite of being in a position where a reversal is nearly achieved, the position is not known to a player, causing an owned strong item which could contribute the reversal to remain unused.

As a result, strategic elements of the game itself were significantly inhibited. Accordingly, there has been a problem that the network game becomes unlikely to be exited. There has been concern that an increase of such hardly-exciting network games may threaten the future of the flourishing network game industry.

In the present invention, the above problems has been solved. By calculating and presenting the rankings also during game play at appropriate times, information for participating in the game more strategically has come to be presented to the users. Thus, amusement of each participating user has been enhanced, and therefore, exited network game environments can be provided.

The present invention will be explained using examples which are applied in a network game, particularly in a social game.

Here, the social game will be briefly explained. The social game refers to an application game soft that operates on a basis of a platform such as an API (Application Programming Interface). The API generally operates on a web browser with SNS information. Hereinafter, the social game is merely referred to as a browser game.

In the social game, SNS information is used. An application program is downloaded to each terminal device operated by a user; the downloaded application program is executed in each terminal device; and various parameters are transmitted and received between each terminal device and the server device. Hereinafter, the social game is merely referred to as an app game.

Here, the following processing that is an example of the present invention can be performed in a server device which provides a game as a browser game, or in a program that is executed as an app game on a terminal device side. Furthermore, examples explained below are for facilitating understanding of the present invention, and the technical range of the present invention is not limited to these examples.

Example 1

Figure 1:
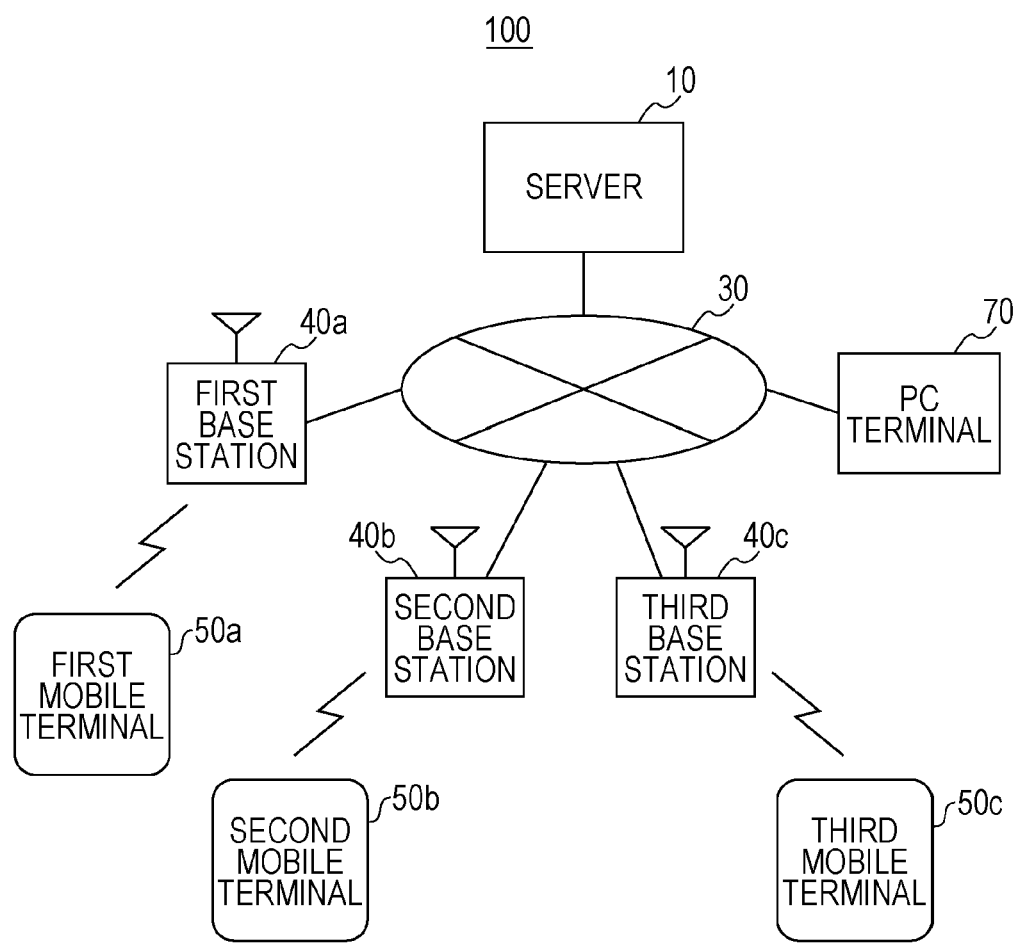
FIG. 1 is a diagram illustrating a configuration example of a social game system according to Example 1.

First, Example 1 will be explained. FIG. 1 is a diagram illustrating a social game system 100 according to Example 1 of the present invention. The social game system 100 includes a server device 10, a network 30 that connects the server device 10 with base stations 40 by wired lines, a first base station 40a to a third base station 40c represented by the base station 40, a first mobile terminal 50a to a third mobile terminal 50c represented by a mobile terminal 50, and a PC terminal 70.

Here, although only three are illustrated as each of the base station 40 and the mobile terminal 50 in the diagram for convenience of illustration, no limitation is made thereto, and three or more base stations 40 and mobile terminals 50 may exist. The same applies to the PC terminal 70. Also, although the first mobile terminal 50a to the third mobile terminal 50c are illustrated as being connected with different base stations 40, no limitation is made thereto. It is clear that even when a plurality of mobile terminals 50 is connected with one base station 40, the present invention can be applied.

The server device 10 is a device that performs and provides a social game service. The server device 10 executes communication processing for game processing with the mobile terminal 50 and the PC terminal 70 through the network 30 and the base station 40. Hereinafter, for simple explanation, an expression such as "communication processing is executed between the server device 10 and the mobile terminal 50 or the PC terminal 70" is used, and a description regarding a fact that the communication processing is performed through the network 30 and the base station 40 is omitted. Also, hereinafter, the mobile terminal 50 and the PC terminal 70 are collectively expressed as a user terminal in some cases. Also, the server device 10 may be a platform providing service associated with a network game, or a server providing an application of a network game.

Figure 2:
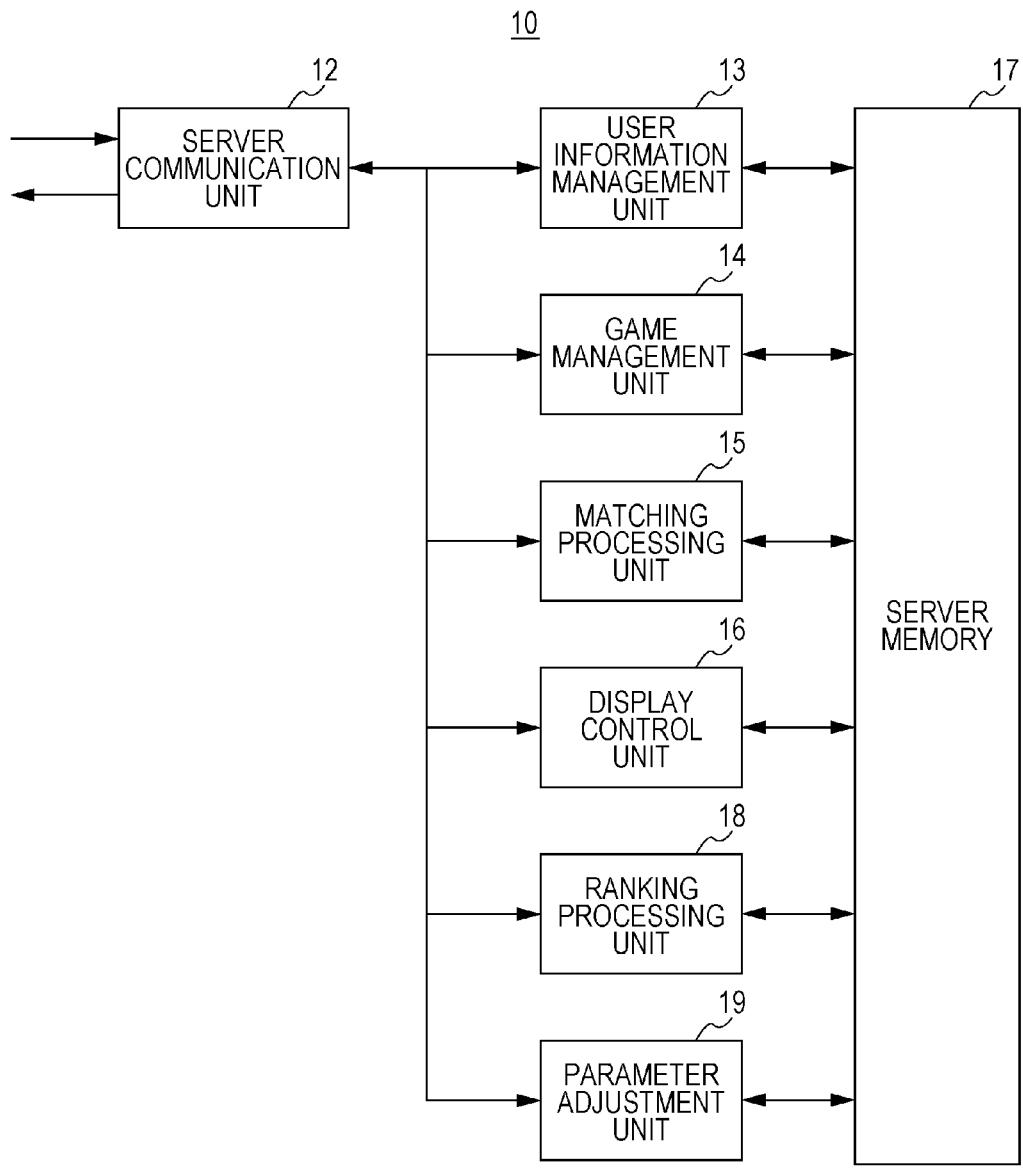
FIG. 2 is a diagram illustrating a configuration example of a server device in FIG. 1.

FIG. 2 is a diagram illustrating a configuration example of the server device 10 in FIG. 1. This server device 10 includes a server communication unit 12, a user information management unit 13, a game management unit 14, a matching processing unit 15, a display control unit 16, a server memory 17, a ranking processing unit 18, and a parameter adjustment unit 19.

The server communication unit 12 communicates with an external SNS server device, user terminal and others through the network 30. Here, the server device 10 may function also as the SNS server device. Therefore, the SNS server device is not illustrated.

The user information management unit 13 acquires user information registered in an SNS from the SNS server device, as well as manages user information registered in a social game in the server memory 17. Also, the user information management unit 13 uploads user information containing the information acquired from the SNS server device to the server memory 17. The server memory 17 stores card management data to be used in a network game in which a card is utilized, as well as user information.

The user information is any one or a combination of user identification information, a user name, an avatar, and a user-input comment. The user information is used when the display control unit 16 described below generates an image in a matching room. Thus, an image which allows a user to visually recognize another user and enhances reality comes to be generated.

FIG. 3 is a diagram illustrating an example of the user management data managed in the server memory 17 in FIG. 2. As illustrated as an example in FIG. 3, the user information management unit 13 may allow data in a table format to be contained in the server memory 17. Here, the user name may be a user name on an SNS, or a user name set for each game.

The user identification information is a unique code that identifies a user. The level is a level, of a user, that sequentially increases based on the number of participations in a game and an acquired experience point. The progress status is information indicating how far each user is proceeding with a game. The owned card identification information is various card identification information such as character cards to be utilized in a team battle and others.

FIG. 4 is a diagram illustrating an example of the card management data managed in the server memory 17 in FIG. 2. As illustrated as an example in FIG. 4, the server memory 17 may contain data in a table format as the card management data. Here, in FIG. 4, the title indicates a card itself, or a title of a character displayed on the card. The rarity value indicates a degree of a rarity value for the card, and is ranked so that rarity increases stepwise, for example, common, uncommon, rare, and super rare. An initial attack value is an attack value in an initial stage for a character in a team battle, and the initial hit point (HP) value is an initial value of a HP for a character in a team battle. Since these are initial values, the values change each time the character evolves and is reinforced while a battle is repeated.

Explanation will be returned to FIG. 2. The game management unit 14 manages progress of a network game in which the plurality of users is allowed to participate through communication lines. Specifically, the game management unit 14 performs various processing such as progress of a social game and management of a quest. The game management unit 14 accesses the user information and the card management data stored in the server memory 17 during progress of a game, to execute predetermined processing.

The game management unit 14 also receives instructions from users belonging to the same team in a network match game performed on a team basis, and calculates an "excitement level". Although details will be described later, the game management unit 14 controls the progress of a network game in accordance with this "excitement level".

The matching processing unit 15 assigns users to a team based on a selected quest while generating matching information, when a quest is selected from a user terminal and a participation request to a team battle is made. The matching processing unit 15 integrates user information for each user whose participation request was received through the server communication unit 12, and generates matching information among users participating in the same network game to be started at the same period of time. Furthermore, the matching processing unit 15 notifies each user terminal from which a participation request was received through the server communication unit 12 of the generated matching information.

At this time, the matching information transmitted to each user terminal differs for each user terminal that made a participation request. For example, when participation requests are made to the same network game which will be started at the same period of time in a plurality of user terminals, the matching processing unit 15 generates matching information which differs for each of the notified terminal device so that the notified user terminal appears to have made a participation request at the earliest time, regardless of the order of participation requests. "The notified user terminal appears to have made a participation request at the earliest time" includes that the notified user terminal is shown as the first participant regardless of its original participation order. For example, participation order information may be forcibly set to be the first, or the alignment order of user information in the matching information may be set so as to be always the top.

This matching information may be generated or notified in two steps so that a timing difference is provided in display of participating user information on a user terminal. According to such an aspect, each participating user can recognize that each user himself or herself is the first participating user, regardless of each participating timing. Details will be described later.

The matching processing unit 15 may also allow the matching information to contain participation order information in which the notified terminal user information is set the first, and to contain the second and subsequent user information in the earlier order of participation among the terminals other than the notified terminal. This participation order information may indicate a display order on the terminal. Accordingly, even when the matching information is not transmitted a plurality of times, an effect similar to the above-described effect can be accomplished by transmitting matching information containing participation order information only once.

The matching information includes matched user information, and may be a matching image itself. In the present example, the display control unit 16 is separately utilized to generate as a matching image an image of a matching room which is intended to represent a waiting room. The matching processing unit 15 outputs the matching information to the display control unit 16.

The display control unit 16 generates a matching room image as a matching image based on the matching image output from the matching processing unit 15. The generated matching room image is transmitted to each user terminal through the server communication unit 12.

Furthermore, the display control unit 16 allows a ranking for each participating user calculated by the ranking processing unit 18 described later to be displayed, while progress of a game is managed in the game management unit 14.

Furthermore, the display control unit 16 changes an aspect of display for the "excitement level" calculated in the game management unit 14 depending on the degree of the level. In an aspect of display, a color may be changed as the excitement level increases; a color gradation may be changed; a design size for indicating the excitement level may be changed; or these may be combined.

Furthermore, the display control unit 16 may also allow the contribution degree of each participating user to the "excitement level" to be displayed. The contribution degree may be, for example, an amount of instruction actions from a participating user received during a predetermined limited time. Here, the instruction actions may be, for example, frequency of touch to a touch panel, magnitude of loudness input in a microphone, or amplitude of vibration given to a user terminal.

Here, in each user terminal, an API as a web browser is utilized to display a matching room image. When the matching processing unit 15 outputs the matching information directly to each user terminal through the server communication unit 12, an API may be utilized to generate the matching room image on a terminal side. In this case, the matching room image itself is not transmitted onto the network 30, and parameter information is mainly subjected to data communication. This is suitable in a narrow network band environment.

The server communication unit 12 receives signals from each user terminal and performs predetermined demodulation processing to transmit the demodulated signals to the user information management unit 13, the game management unit 14, the matching processing unit 15, and the display control unit 16. The server communication unit 12 also performs predetermined modulation processing to signals transmitted from the user information management unit 13, the game management unit 14, the matching processing unit 15, and the display control unit 16 to transmit the modulated signals to each user terminal. In this case, as the modulation and demodulation processing in the server communication unit 12, conventionally utilized modulation and demodulation technologies may be utilized. It is understood by those skilled in the art that even in such an aspect, the present invention can be applied.

The ranking processing unit 18 calculates, during progress of a network game managed by the game management unit 14, a degree of contribution to the network game as an active level for each participating user, at a periodical or predetermined timing, and then determines a ranking in the descending order of the "active level".

The "active level" is a value calculated based on at least one of the number of predetermined instructions from a user to the network game, or the degree of an action which has promoted the progress of the game.

The number of predetermined instructions may be, for example, the number of attacks to an attack target, the number of special attacks such as finishing moves performed, the frequency of use of an item, or a combination thereof.

The degree of an action which has promoted the progress of the game may be, for example, a total amount of damage that a participating player caused to an opponent character, the size of a maximum damage amount per attack, the size of an average damage amount per attack, or a combination of these multiple elements. For example, the total damage amount, the number of attacks and the frequency of use of an item each may be multiplied by a weight coefficient, and then added to each other, thereby to calculate the active level.

The parameter adjustment unit 19 adjusts a user parameter stored for each participating user, in accordance with a ranking determined by the ranking processing unit 18 when the network game is terminated, so as to become advantageous in terms of game progress in the next and subsequent network games. For example, higher acquired experience value and acquired prize are provided to a user in a higher ranking position when the network game is terminated. Alternatively, awards such as items may be provided only to a user positioned in a predetermined range from the highest rank.

The parameter adjustment unit 19 may also adjust the parameter for each participating user in accordance with not only the ranking when the game is terminated but also a provisional ranking determined during progress of a network game, so as to be advantageous in the network game in progress. For example, in a case where a player's own attack turn comes after every predetermined waiting period during a battle against an opponent character, the length of the "waiting period" may be adjusted among the participating users based on a difference in the total damage amount that has been caused to the opponent character.

The expression "the parameter is adjusted so as to be advantageous in the network game in progress" means, for example, that the parameter may be adjusted so that when the ranking during progress of the network game is lower, the network game can be progressed more advantageously. For example, when the ranking is lowered, a bonus may be provided to a damage caused to an opponent so that a chance to reverse the ranking is provided. Also, the above-described "waiting period" that is a cycle in which an attack turn comes may be temporarily shortened. Accordingly, the turnover of the ranking is promoted, thereby further enhancing amusement.

Figure 5:
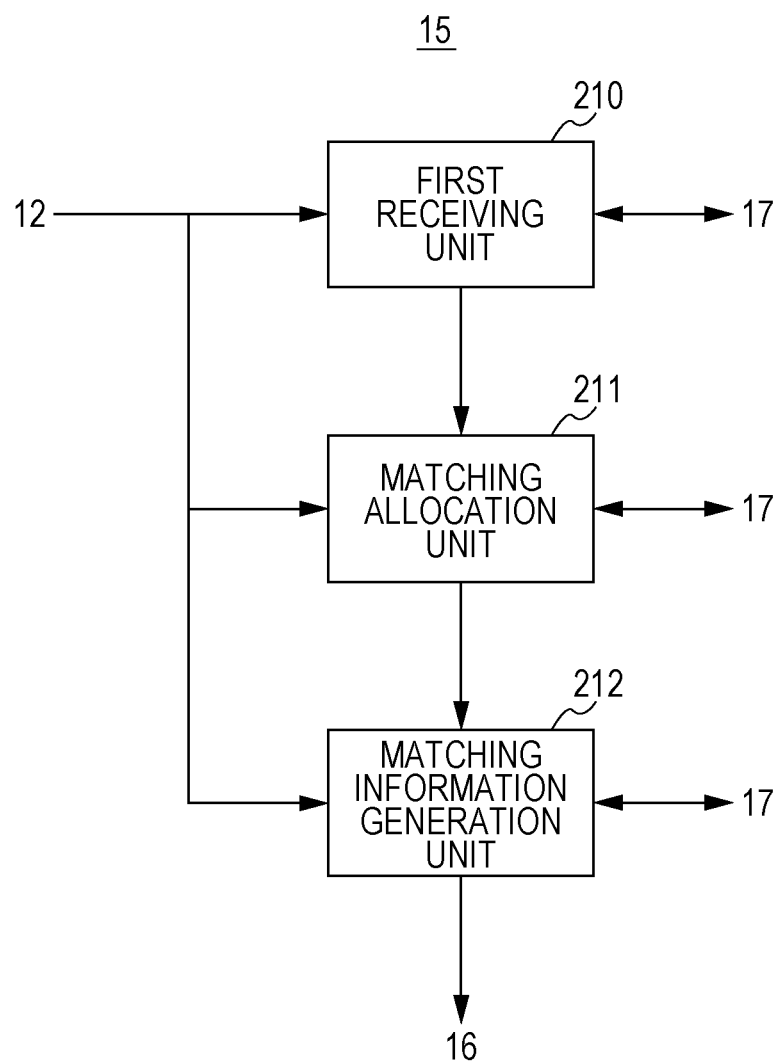
FIG. 5 is a diagram illustrating a configuration example of a matching processing unit in FIG. 2.

Next, the matching processing unit 15 will be explained using FIG. 5. FIG. 5 is a diagram illustrating a configuration example of the matching processing unit 15 in FIG. 2. The matching processing unit 15 includes a receiving unit 210, a matching allocation unit 211, and a matching information generation unit 212.

The receiving unit 210 receives a participation request to a team battle concerning a network game in which one or more users can participate, from each of user terminals used by a plurality of users, through communication lines and the server communication unit 12. The receiving unit 210 extracts parameters such as for which quest the participation request to a team battle is made, who the user is, and from which terminal the request is made. Then, the parameters are stored in the server memory 17 while the request is output to the matching allocation unit 211.

Furthermore, the receiving unit 210 receives comment information for each user terminal from which a participation request has been received, and receives a search request for searching an enemy to allow the network game to progress. Details will be described later.

Figure 6:
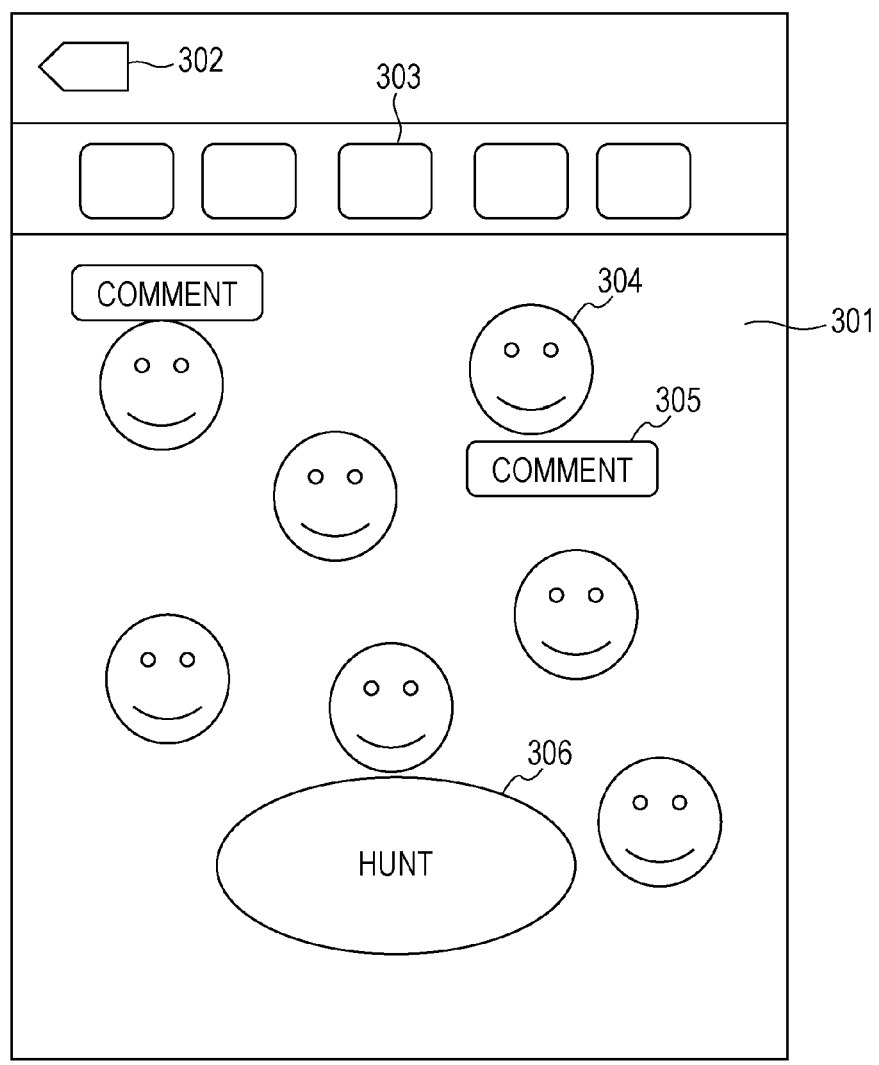
FIG. 6 is a diagram illustrating a first screen display example of a user terminal in FIG. 1.
Figure 7:
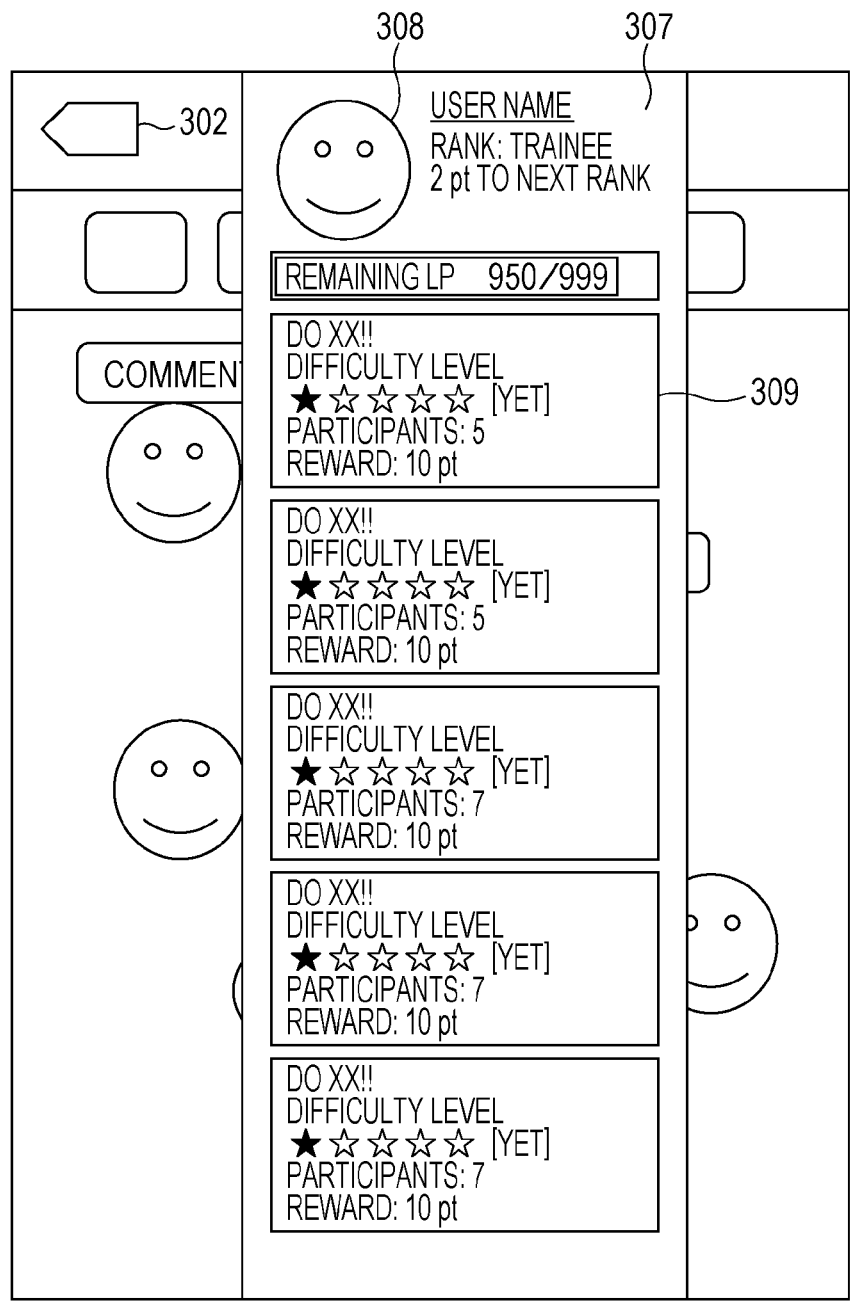
FIG. 7 is a diagram illustrating a second screen display example of a user terminal in FIG. 1.

Here, a brief explanation will be made using FIG. 6 and FIG. 7. FIG. 6 is a diagram illustrating a first screen display example 610 of a user terminal in FIG. 1. FIG. 7 is a diagram illustrating a second screen display example 620 of a user terminal in FIG. 1. Here, the screen display of a user terminal is used for facilitating understanding. These screen displays are generated by the display control unit 16 under instructions from the game management unit 14 and the matching processing unit 15 of the server device 10, and displayed on the screen of the user terminal. Although the configuration and action of a terminal will be described later, and embodiments below will be explained based on an assumption that input manipulation is performed with a touch panel of a screen, the manipulation may be performed by a mouse operation and others.

In a first screen display example 610, there are displayed a user unique my page screen 301 which is a basic screen of the social game, a return button 302 used when terminating a game, various menu buttons 303, other user avatars 304, comment columns 305 corresponding to the avatars 304, and a hunt button 306 that becomes a trigger to start a battle. In a second screen display example 620, there are displayed a quest selection screen 307, an avatar 308, quest selection buttons 309, in such a manner as being superimposed on the screen of the first screen display example 610.

When a user performs input manipulation to the hunt button 306 while the first screen display example 610 is displayed, the screen is transited to the second screen display example 620 illustrated in FIG. 7 which is in a hunt mode, and the quest selection screen 307 appears. Here, a hunt means a trigger to start a battle game.

In the hunt mode, the avatar 308, user name, rank, points to next rank, remaining LP value (LifePoint), LP value gauge and others are displayed on the quest selection screen 307, as information of a user who has performed input manipulation of the hunt button 306. Also, the plurality of quest selection buttons 309 appear, and a user selects one of the buttons.

In this case, each of the quests is different in the upper limit of the number of participants, difficulty level, acquired reward and others. In input manipulation, a user select an appropriate quest considering a user's own status, the strength of a deck and others. In each of the quest selection buttons 309, the difficulty level, acquired reward and others are displayed. In the quest, a team including a plurality of users is organized, and a team battle in which the team fights against an opponent character is performed.

The input manipulation of the quest selection button 309 becomes a trigger to initiate communication of a user terminal with the server device 10, so that a participation request is transmitted to the receiving unit 210.

Explanation will be returned to FIG. 5. The matching allocation unit 211 performs processing of allocating each user having performed a participation request to a team in response to the input manipulation performed to the quest selection button 309. Then, the matching allocation unit 211 uploads the information to the server memory 17, while outputting the information to the matching information generation unit 212. Such manipulation is continued until the number of participants for each quest reaches an upper limit.

The matching information generation unit 212 generates matching information for each user terminal. The matching information is used to generate a matching room image to be transmitted to each user terminal, based on the output from the matching allocation unit 211 and the information in the server memory 17. Specifically, an example as below are included.

Matching Information
Information of user 1
Information of user 3
Information of user 2

In the above example, information of users who have made participation requests to the same quest is listed in the order of a participation request performed from above. In this case, when user 3 has made a participation request secondly, information of user 1 comes to be contained before user 3 in the matching information. When a matching room image is thereafter generated based on the matching information, an avatar of user 1 comes to be contained before user 3. Thus, an impression that user 3 has participated in the team as a guest is left. As a countermeasure, in the present embodiment, even when users have made participation requests in the above order, matching information for generating a matching room screen to be firstly transmitted to a terminal of user 3 is generated as below.

Here, the matching information may contain information of a user participating in the quest, information indicating a participating order, past quest achievements and others. The information of a user may contain a user ID and a user name, or an ID of a user matched in the past. The quest achievements may contain a cumulative point, the number of wins, the number of participations, level information, card information and others.

Matching Information (First)
Information of user 3

That is, the matching information to be firstly transmitted to each user terminal always contains only the user's own information, and information of other users is excluded.

The matching information for generating a matching room screen to be secondly transmitted to a terminal of user 3 is as below.

Matching Information (Second)
Information of user 3
Information of user 1

The matching information for generating a matching room screen to be thirdly transmitted to a terminal of user 3 is as below.

Matching Information (Third)
Information of user 3
Information of user 1
Information of user 2

The above is matching information to be transmitted to user 3. The matching information to be transmitted to user 2 is as below.

Matching Information
Information of user 2
Information of user 1
Information of user 3

That is, the order of user information in the matching information is determined so that user information of the notified terminal takes the first place, and user information of the terminals other than the notified terminal takes second and subsequent places in the earlier order of participation. Here, the order of user information in the matching information may be randomly determined in second and subsequent places, as long as user information of the notified terminal takes the first place.

As described above, in the present embodiment, information of a user operating the terminal is preferentially contained in matching information, and the following matching information is generated such that information of each user is added one by one regardless of the order of participation requests.

However, no limitation is made thereto, and only user information which is a difference from that previously transmitted may be contained. Alternatively, the second and subsequent matching information may be generated at a timing where the receiving unit 210 receives a search request described later. Alternatively, transmittance may not be performed every time the above-described first to third matching information are generated, and only matching information generated after the number of participants has reached a fixed number may be generated.

Even in such an aspect, matching information can be indicated as if the notified user terminal had made a participation request at the earliest time. Thus, the matching information allows each user participating in the game to recognize that the each user has first expressed his or her participation in the game. This promotes the user to make an independent and positive contribution to the team. Therefore, the game is likely to be exited.

By generating matching information for each user terminal as described above, each user feels that the each user has first entered in a matching room. Accordingly, the user comes to be independent, and try to boost the mood of a game. Therefore, the user can enjoy an exciting game as a whole.

Furthermore, since information of other users is not added at one time but is gradually added one by one, expectations of a game are gradually increased. Thus, a user feels a sense of exaltation, and amusement of the game can be enhanced.

Here, when the user information of the second and subsequent places is contained in the matching information, consideration may be given on the order of priority. A brief explanation will be made below. The server memory 17 of the server device 10 has past history information that allows examination of a correlation among users. For example, based on correlations of a frequency of team formation, shortness of a count time from the latest date and time when a team is formed, a degree of relationship on an SNS, a character group type, an attribute, a level and others, the level of affinity is judged. Then, a user having high affinity is preferentially added in matching information. When such consideration is given, information of users having made participation requests to some quest is pooled first. Among the information, matching between the users is performed, based on past history information which allows examination of correlations between the users described above.

By preferentially adding information of a user having high affinity, the user operating the terminal feels as if an intimate friend had gathered in a hurry. Thus, a sense of exaltation can be enhanced, and amusement of the game can be enhanced. Furthermore, since users having high affinity to each other are matched as the same team, a possibility that exchanges are initiated between the users is increased. Thus, exchanges between users can be more activated.

Figure 8:
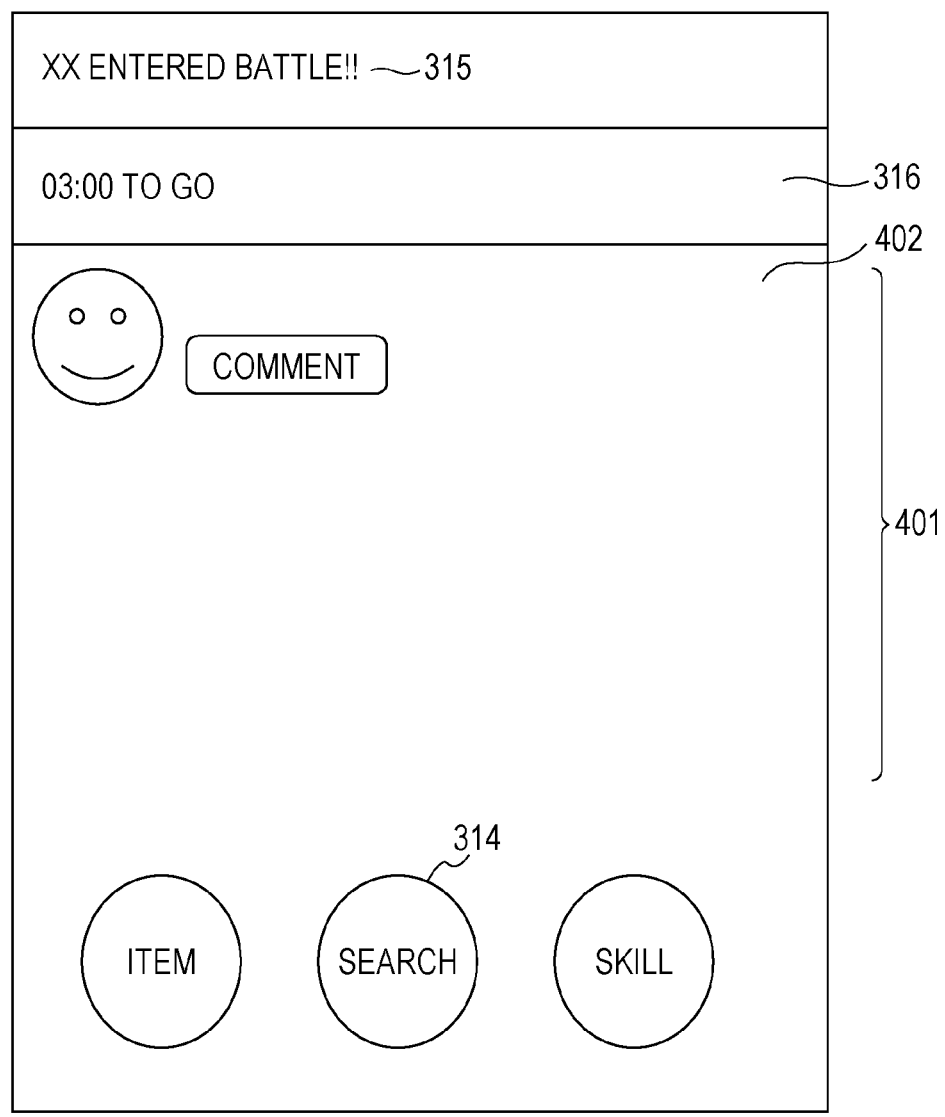
FIG. 8 is a diagram illustrating a third screen display example of a user terminal in FIG. 1.
Figure 9:
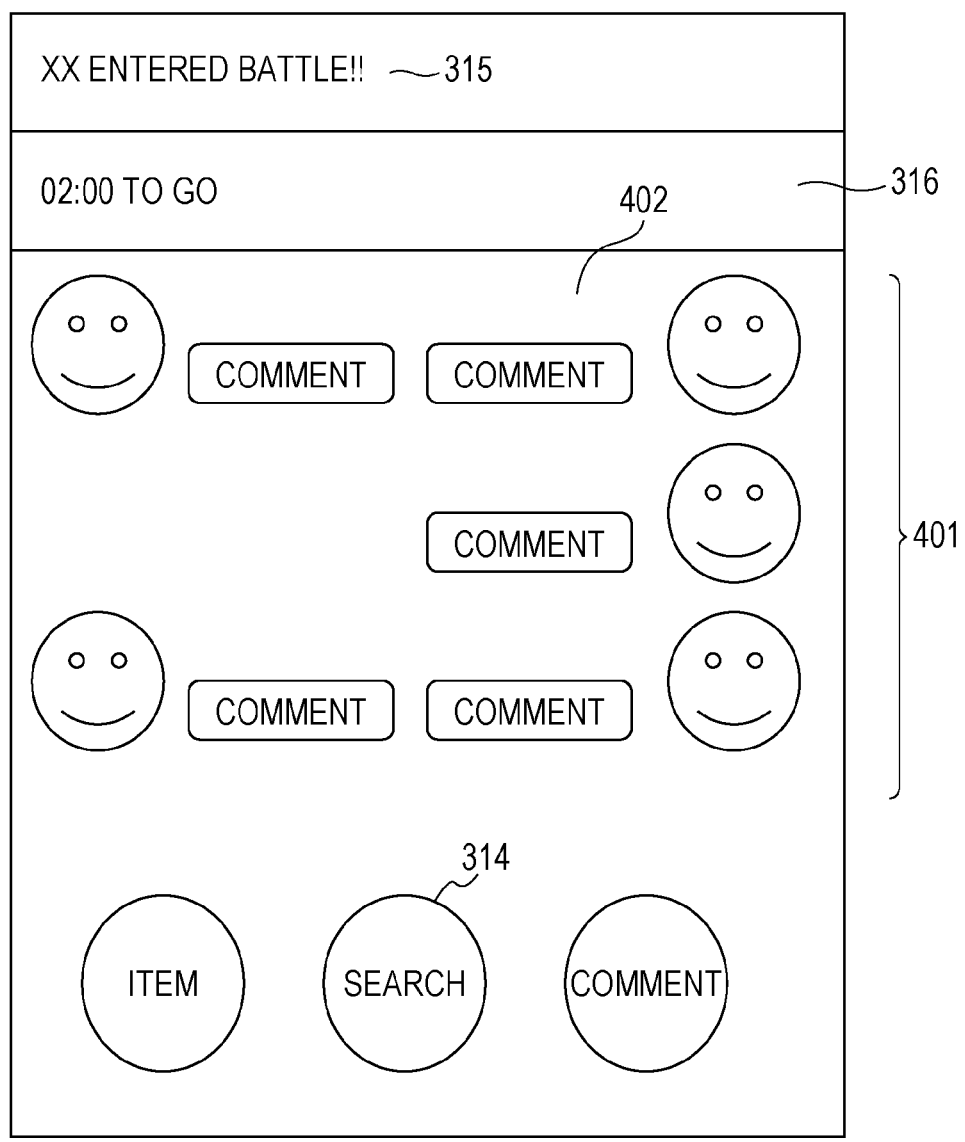
FIG. 9 is a diagram illustrating a fourth screen display example of a user terminal in FIG. 1.

Here, a screen displayed when matching information generated by the matching information generation unit 212 is notified to a user terminal will be explained by using FIG. 8 and FIG. 9. FIG. 8 is a diagram illustrating a third screen display example 630 of the user terminal in FIG. 1. FIG. 9 is a diagram illustrating a fourth screen display example 640 of the user terminal in FIG. 1. On the third screen display example 630 and the fourth screen display example 640, a battle participation announcement column 315, a timer column 316, a user information display column 401, and a matching room image 402 are displayed.

In the user information display column 401 of the matching room image 402, an avatar is displayed together with a comment, as information of a user who has made a participation request to a team battle and have been allocated to the same team. Here, in the matching room image 402, there are displayed the battle participation announcement column 315 in which a user name is displayed based on information of a user added most recently, and the timer column 316 in which a remaining time to a deadline of participation in a team battle is displayed.

As illustrated in the fourth screen display example 640 of FIG. 9, user information is sequentially displayed in the user information display column 401. Accordingly, an avatar image and a comment are added to one another. In brief, while only the user's own information is displayed at a "remaining time of three minutes" illustrated in the timer column 316 in the third screen display example 630, other users' information are added at a "remaining time of two minutes" in the fourth screen display example 640. In this case, whatever the order of participation requests by users is, user information is displayed in such an order. It is noted that user information of a user who himself of herself views the matching room image 402 does not need to be included in many cases. In such a case, the user's own information does not need to be actively displayed in the matching room image 402. It should be understood that this is also included in the present embodiment.

Figure 10:
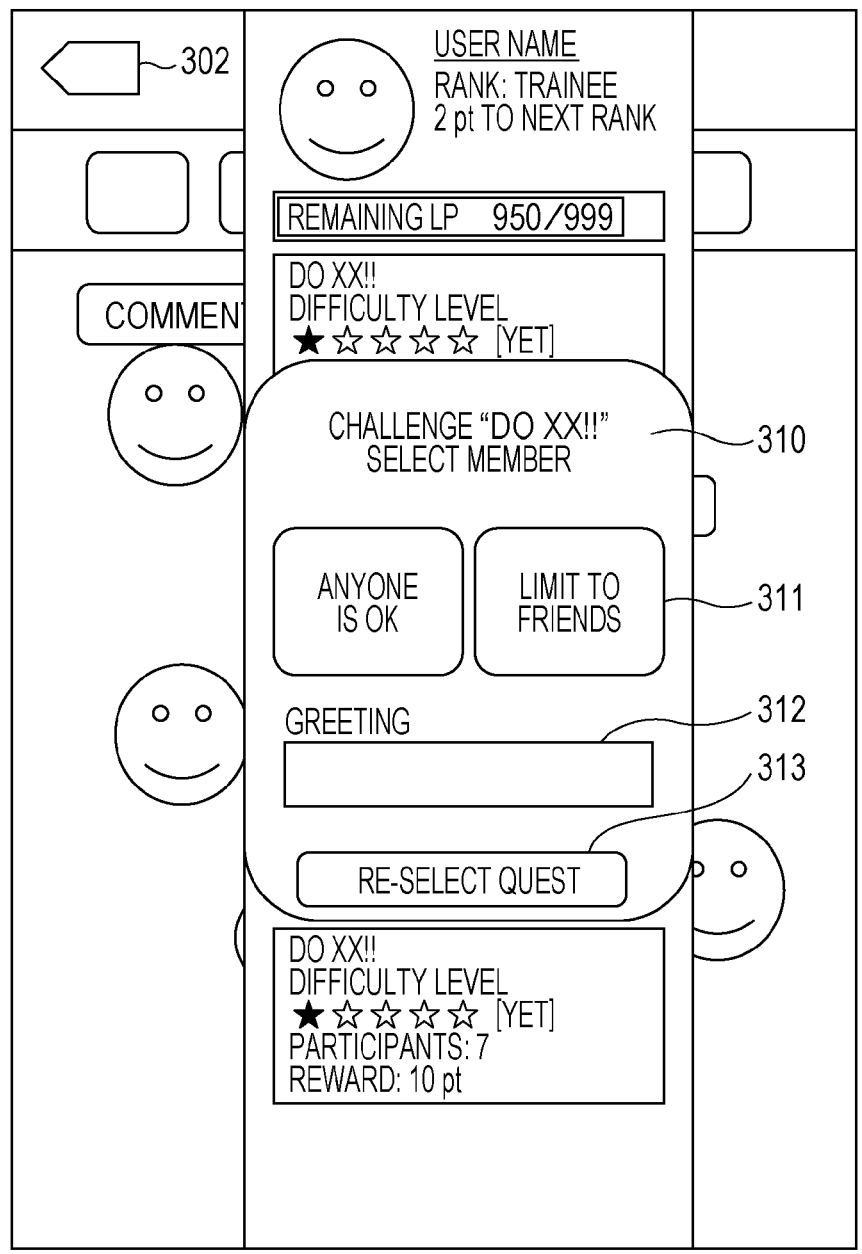
FIG. 10 is a diagram illustrating a fifth screen display example of a user terminal in FIG. 1.

Next, processing performed in a user terminal after the quest selection button 309 in the second screen display example 620 illustrated in FIG. 7 has been subjected to input manipulation will be explained by using FIG. 10. FIG. 10 is a diagram illustrating a fifth screen display example 650 of the user terminal in FIG. 1. On the fifth screen display example 650, a menu image 310, a member selection button 311, an input column 312, and a re-selection button 313 are displayed.

After the quest selection button 309 of the second screen display example 620 illustrated in FIG. 7 has been subjected to input manipulation, the screen display is transited to the fifth screen display example 650. On the transited screen display, the member selection and comment input menu image 310 are displayed. On the menu image 310, there is displayed the member selection button 311 which allows for selection of limitation of members forming a team.

In the fifth screen display example 650, two buttons are displayed as the member selection button 311. A user can select either mode of "Limit to friends" in an SNS or "Anyone is OK". Furthermore, there is the input column 312 in which a greeting can be input. By inputting the greeting comment, a friendship can be developed. There is also displayed the re-selection button 313 for processing of re-selecting a quest. When the re-selection button 313 has been subjected to input manipulation, manipulation to return to the quest selection screen 307 illustrated in FIG. 7 is performed.

Here, when the "Anyone is OK" mode is selected with the member selection button 311, users who have selected the same quest selection button 309 during a predetermined time are allocated to the same team with each other. However, when the number of users making a participation request to the team battle has reached a team maximum number, the team allocation terminates, and the team battle game progresses. When the upper limit of participants to the team battle has not been reached and the deadline of participation has come, a so-called NPC (Non Player Character), instead of a general user, may be replenished to proceed with the game. This is because, in a state of vacancy, the fighting strength of a team can be reduced thereby to impair progress of the game, or a sense of exaltation of the user can be inhibited.

Next, when input manipulation of the member selection button 311 and a comment to the input column 312 have been made in a user terminal, the comment is displayed in an aspect of corresponding to the avatar image corresponding to the user terminal where the comment has been input, in the matching room image 402, as illustrated in the third screen display example 630 of FIG. 8 and the fourth screen display example 640 of FIG. 9, or in a below-described comment scroll column 317 of FIG. 11, on each user terminal participating in the team battle.

A plurality of buttons for a team battle, such as a search button 314, are displayed in the matching room image 402, to allow for input manipulation. By performing input manipulation of the search button 314 in the matching room, a user finally finds an opponent character, and enters a battle game by the formed team.

Figure 11:
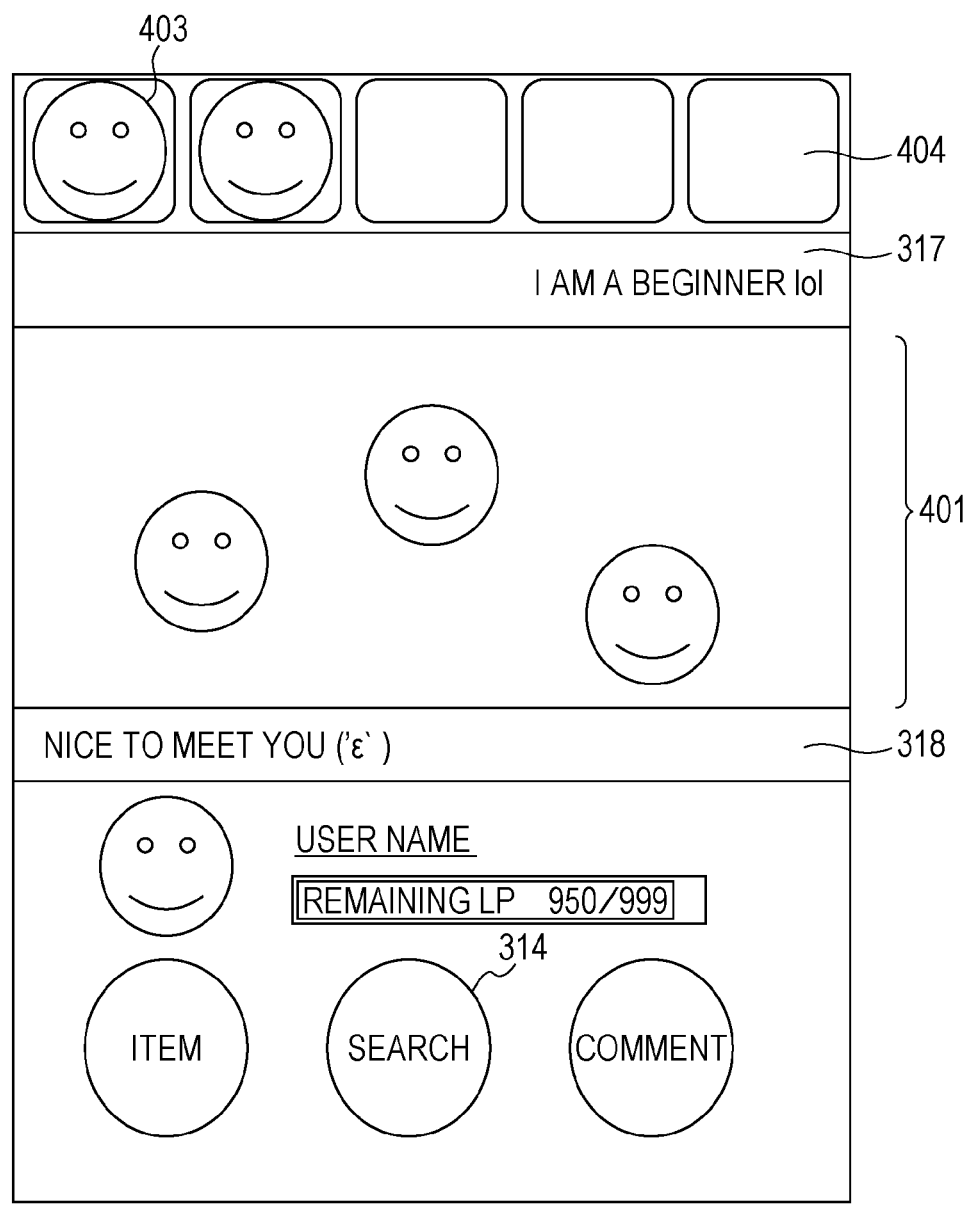
FIG. 11 is a diagram illustrating a sixth screen display example of a user terminal in FIG. 1.

It should be noted that the second screen display example 620 and the third screen display example 630 illustrated in FIG. 8 and FIG. 9 respectively are in the different aspect from a third screen display example 410 illustrated in FIG. 11. Although the matching room image 402 is displayed in all of these examples, the information of users having performed a participation request to a team battle is arranged so that, for example, avatars and comments are combined and aligned in the second screen display example 620 and the third screen display example 630.

FIG. 11 is a diagram illustrating a sixth screen display example 660 of a user terminal. In the sixth screen display example 660, the comment scroll columns 317 and 318, avatars 403, and a team member display column 404 are displayed.

Specifically, information of users having made a participation request to a team battle is sequentially displayed as, for example, the avatar 403 in the team member display column 404, and the comment is displayed in the comment scroll columns 317 and 318 so as to be automatically scrolled. When the comment is displayed, processing may be made so that, for example, the avatar corresponding to the user terminal in which the comment has been input blinks, and so on. Thus, the comment overlay-displayed on the matching room image 402 comes to flow, improving a dramatic effect.

In another aspect, during a waiting time before a team battle is started, a user may enjoy a conversation with other users while having a chat with a comment in the matching room, inhibiting each user from being bored during the waiting time.

Here, actions performed by a waiting user in the matching room will be specifically explained. A user can perform, for example, a mission game where the user searches a field, by performing input manipulation of the search button 314. This is for inhibiting a user from being bored, by allowing the user to perform an entertainment during a time before a team battle is started. In such a mission game, a user can obtain various game contents such as experience points, in-game currency, cards and items. Each time a user performs input manipulation of the search button 314, other users gradually join in a team.

In this case, such an entertainment is not limited to a mission game, but may be a quiz game and a shooting game. Also, while performing a mission game and others, a display previously teaching information of an opponent to fight against from now, like "Analyzing . . . ," "Result of analysis: Data of your opponent is . . . , the weak point is . . . ", may appear. By performing such processing, a waiting time on the matching room screen becomes more meaningful, and user's interests in a game can be enhanced.

Figure 12:
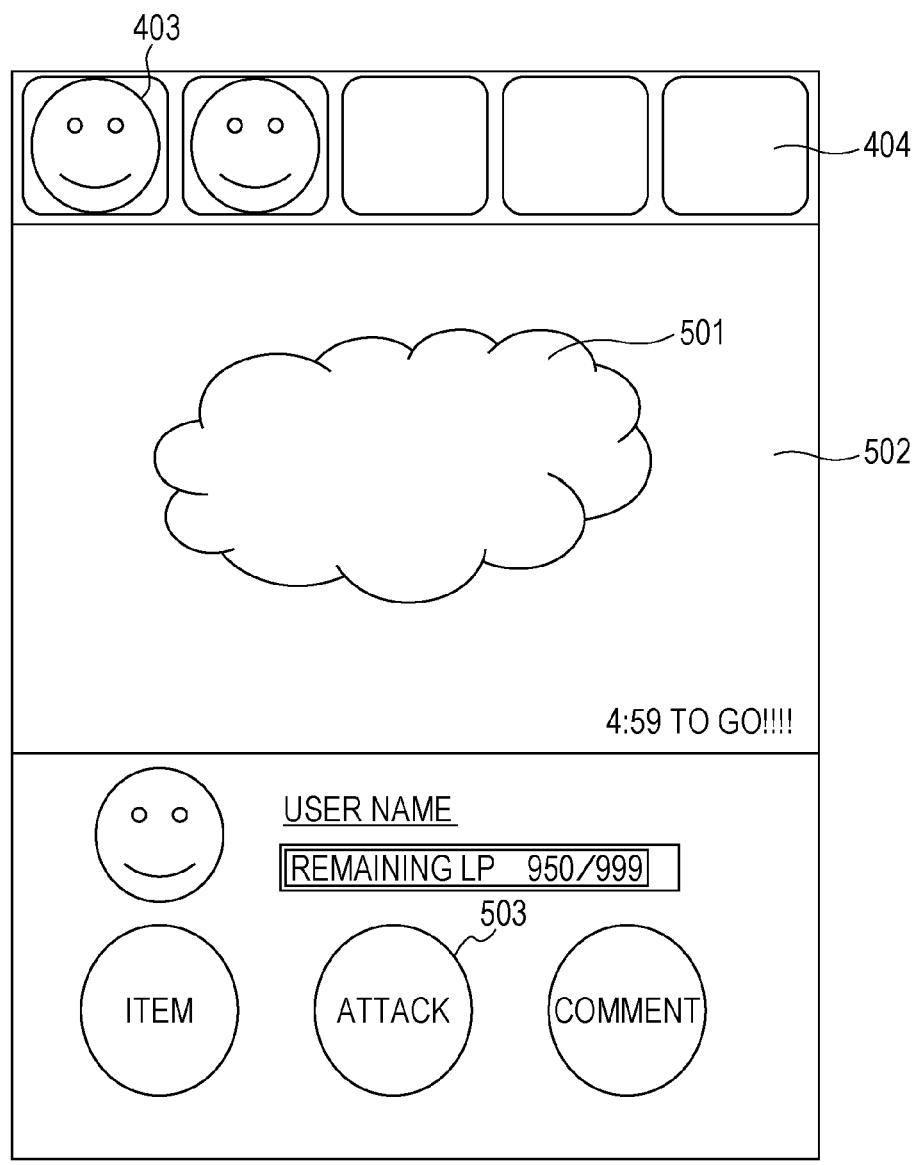
FIG. 12 is a diagram illustrating a seventh screen display example of a user terminal in FIG. 1.

Next, a case of entering a team battle mode will be explained by using FIG. 12. FIG. 12 is a diagram illustrating a seventh screen display example 670 of the user terminal in FIG. 1. The seventh screen display example 670 is an example where an opponent character image 501, a battle image 502, and an attack button 503 are displayed.

In the team battle mode, the opponent character image 501 is displayed in a column of the battle image 502. The seventh screen display example 670 is different from the matching room screen, in that the search button 314 does not exist, and instead the attack button 503 allowing for initiation of an attack against an opponent character is displayed. Each user performs input manipulation of the attack button 503 to proceed with a battle, for example, to perform an attack against an opponent character.

Here, a display example when ranking processing has been performed in the server device 10 of FIG. 2 is explained by using FIG. 12. As described above, the seventh screen display example 670 illustrated in FIG. 12 is an example of a screen displayed on a user terminal when having entered the team battle mode.

As described above, in this seventh screen display example 670, the avatars 403 of participating users are displayed in the team member display column 404. At this time, the display control unit 16 realigns the order of the avatars 403 to be displayed according to the ranking determined by the ranking processing unit 18. The timing of realignment is synchronized with the timing of update of the ranking by the ranking processing unit 18. Therefore, a real-time order can be presented to participating users.

In the seventh screen display example 670, the avatars 403 of participating users are displayed from the left end of the team member display column 404 in the descending order of damage given to an opponent character at that time. A display method of a ranking is not limited to the above-described case. For example, the number indicating a ranking may be displayed on an icon of a participating user; the color of a background of an icon may be changed according to a ranking; a frame may be formed thicker; or, any of these may be combined.

Furthermore, there may be two or more evaluation axes for a ranking calculated by the ranking processing unit 18. For example, when the ranking based on a total damage amount given to an opponent character and the ranking of the number of attacks exist, the display control unit 16 may allow the ranking to be displayed from the left end of the team member display column 404 in the order based on the total damage amount given to an opponent character, while displaying the number in the upper right of an icon in the order of the player having performed more attacks. According to such an aspect, a ranking can be displayed from a plurality of viewpoints at a time. Therefore, user's eagerness can be elicited from various viewpoints.

Figure 13:
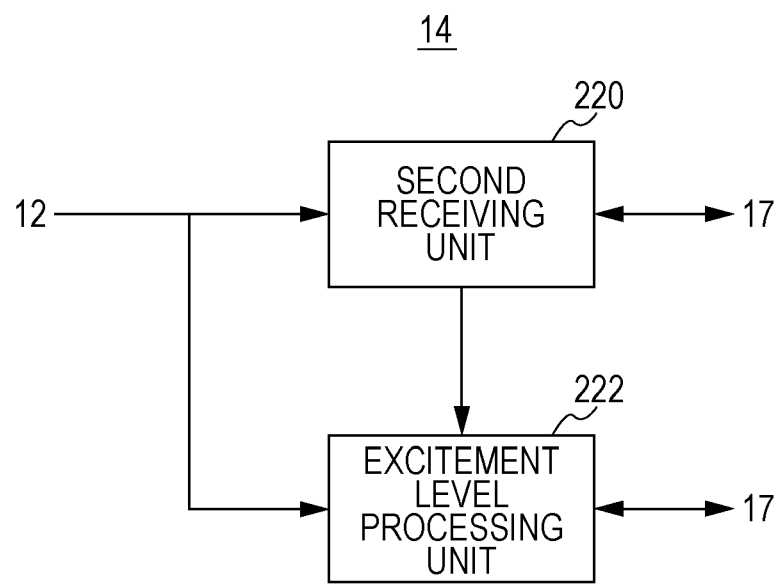
FIG. 13 is a diagram illustrating a configuration example of a game management unit in FIG. 2.

FIG. 13 is a diagram illustrating a configuration example of the game management unit 14 in FIG. 2. The game management unit 14 includes a second receiving unit 220 and an excitement level processing unit 222.

The second receiving unit 220 receives an instruction action for the same objective, from a user belonging to a team formed with users being in a cooperative relationship with each other among users participating in a network game, for a predetermined limited time. The instruction action for the same objective includes an instruction, to an opponent character common among the users, related to an attack for defeating the opponent character. The instruction related to an attack includes an action of rapidly hitting a touch panel, an action of using a certain item and others.

The excitement level processing unit 222 calculates an excitement level in accordance with a total amount of instruction actions received by the second receiving unit 220 from each user in the same team. In accordance with the calculated excitement level, the game management unit 14 proceeds with the network game. The total amount of instruction actions from users may be a total amount of damage to an opponent character by participating users. In calculation of the excitement level, calculation may be performed on (1) how many players caused, (2) how much damage, for example, every five seconds. Then, an increased amount of a gauge of the excitement level may be accordingly controlled.

Here, when the excitement level exceeds a predetermined value, the game management unit 14 may allow to move to a "CONCERTED ATTACK BY ALL mode". In this case, the second receiving unit 220 sets a certain limited period, and receives the number of rapid hits of a tap from participating users. The game management unit 14 may provide, after expiration of the limited period, a damage amount corresponding to a total of the number of rapid hits to an opponent character, bonus points to participating users, bonus points to a participating user having most contributed to an increase of the excitement level, or any combination thereof.

Figure 15:
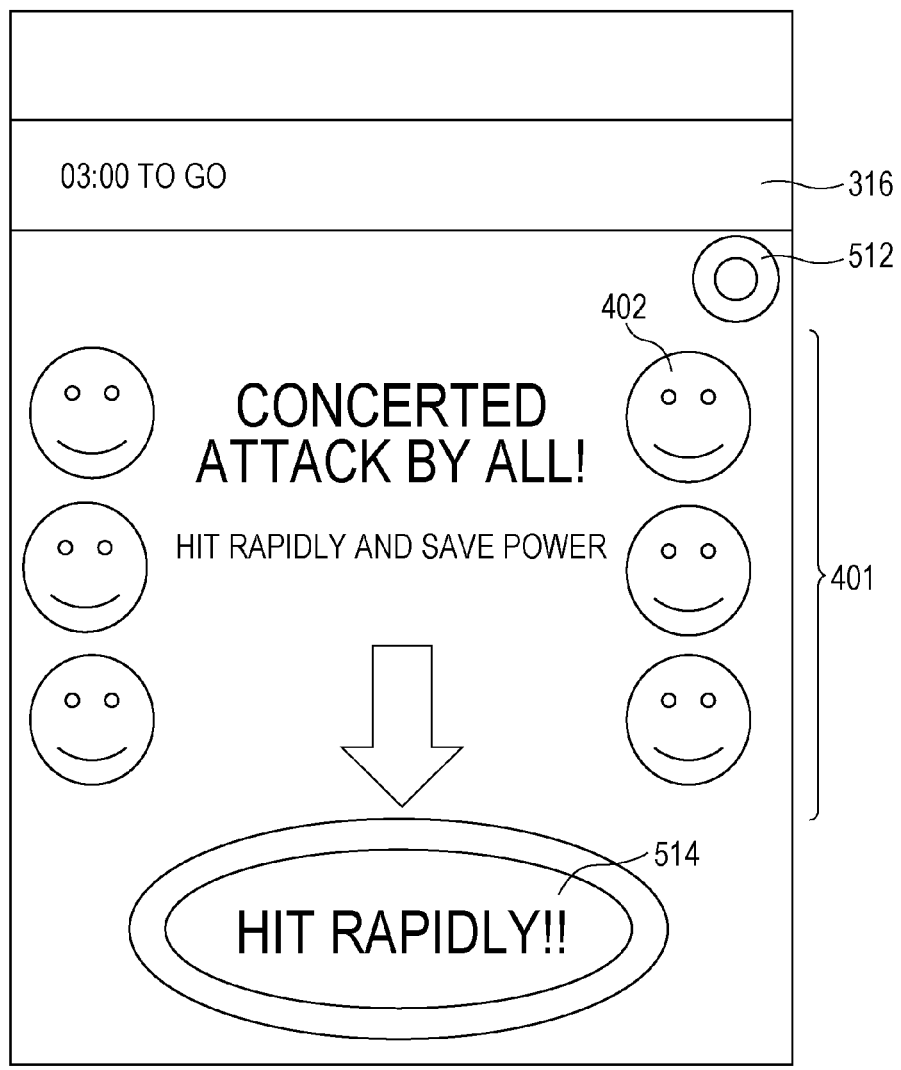
FIG. 15 is a diagram illustrating a ninth screen display example of a user terminal in FIG. 1.
Figure 16:
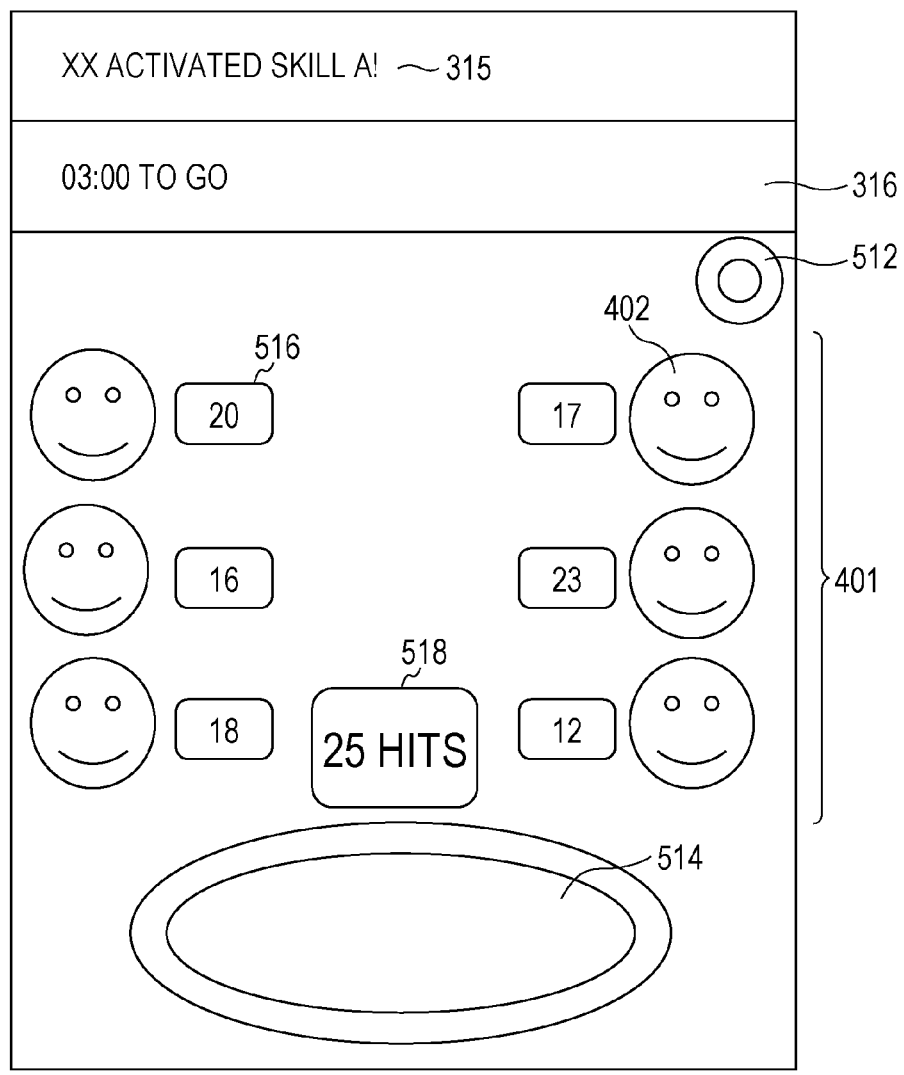
FIG. 16 is a diagram illustrating a tenth screen display example of a user terminal in FIG. 1.

Next, a display example when having performed processing related to the "excitement level" in the second receiving unit 220 and the excitement level processing unit 222 of FIG. 13 will be explained by using FIG. 14 to FIG. 16.

Figure 14:
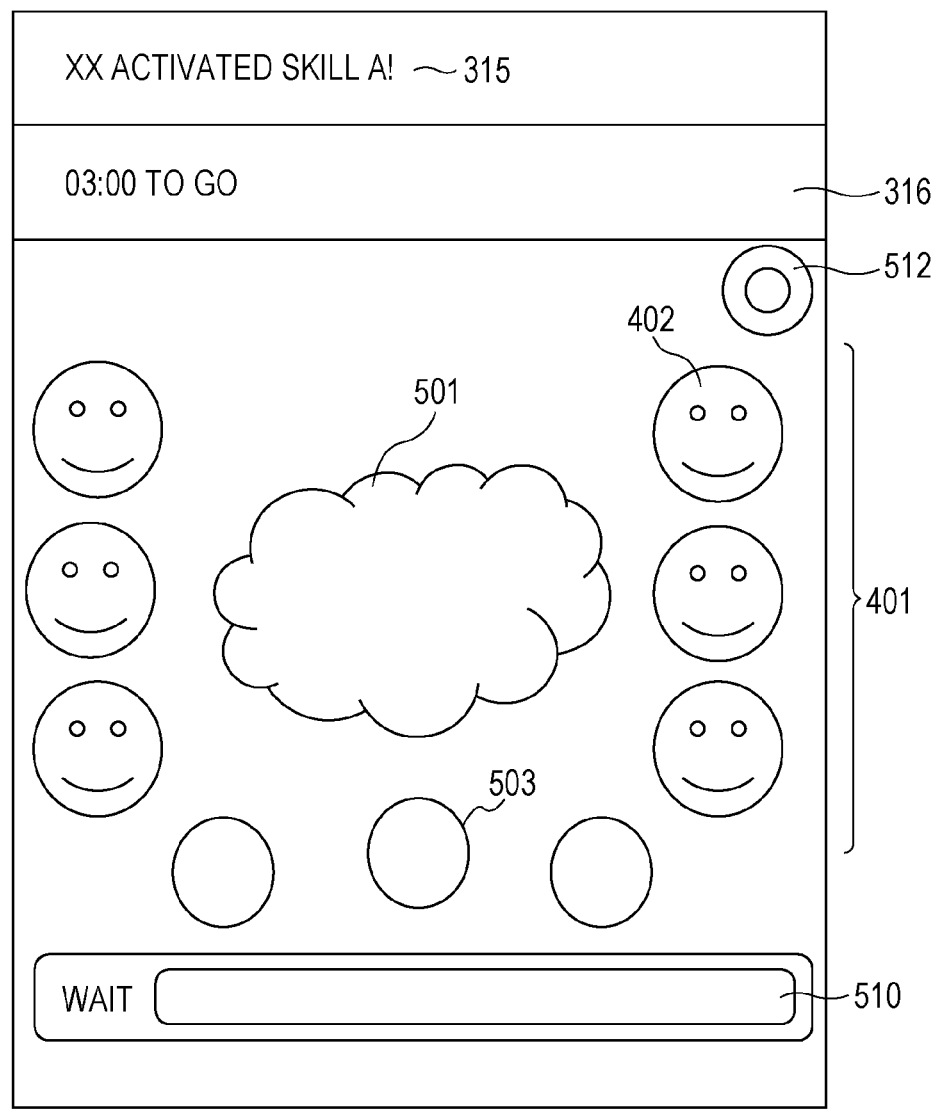
FIG. 14 is a diagram illustrating an eighth screen display example of a user terminal in FIG. 1.

FIG. 14 is a diagram illustrating an eighth screen display example 680 of the user terminal in FIG. 1. The eighth screen display example 680 includes a weight gauge 510 and an excitement level gauge 512. FIG. 15 is a diagram illustrating a ninth screen display example 690 of the user terminal in FIG. 1. The ninth screen display example 690 includes a rapidly hitting button 514. FIG. 16 is a diagram illustrating a tenth screen display example 700 of the user terminal in FIG. 1. The tenth screen display example 700 includes a member rapidly hitting number 516 and a user rapidly hitting number 518.

The weight gauge 510 displayed in the eighth screen display example 680 is a column for visually displaying the length of a "waiting period" that is one of the parameters adjusted for each participating user by the parameter adjustment unit 19. The display control unit 16 allows the length of the "waiting period" to be displayed with the length of the gauge in the weight gauge 510, and as the "waiting period" is consumed, the gauge may be displayed to be shortened. As described above, participating users cannot perform the next attack until the "waiting period" displayed in the weight gauge 510 is completely consumed. After the attack, the "waiting period" is cleared, and a waiting state continues until the waiting period is consumed to 0 again.

The excitement level gauge 512 displayed in the eighth screen display example 680 to the tenth screen display example 700 is a column for indicating the magnitude of the "excitement level" processed by the excitement level processing unit 222.

The excitement level processing unit 222 calculates an excitement level in accordance with a total amount of instruction actions received by the second receiving unit 220 from each user in the same team, and instructs the display control unit 16 to change an aspect of the display of the excitement level gauge 512. The change of an aspect of the display of the excitement level gauge 512 may be made by processing of changing color, changing the size of a gauge, and so on.

Here, when the excitement level exceeds a predetermined value, the game management unit 14 instructs, as the "CONCERTED ATTACK BY ALL mode", the display control unit 16 to allow the ninth screen display example 690 to be displayed. The second receiving unit 220 of the game management unit 14 counts the number of taps by participating users on the position of the rapidly hitting button 514 displayed in the ninth screen display example 690 for a predetermined period. This count is processed for a predetermined period for each user. In the "CONCERTED ATTACK BY ALL mode", a chance of rapidly hitting the button for three seconds is provided to all participating users.

Then, after the "CONCERTED ATTACK BY ALL mode" is terminated, the number of rapid hits for each participating user is displayed, as illustrated in the member rapidly hitting number 516 and the user rapidly hitting number 518 of the tenth screen display example 700. Then, a design indicating a full-scale attack by all team members against an opponent character is displayed, and damage corresponding to the number of rapid hits by participating users is given to an opponent character. At this time, when the number of rapid hits by one participating user coincides with the number of rapid hits by another participating user, the game management unit 14 may generate a bonus to increase damage given to the opponent character.

Figure 17:
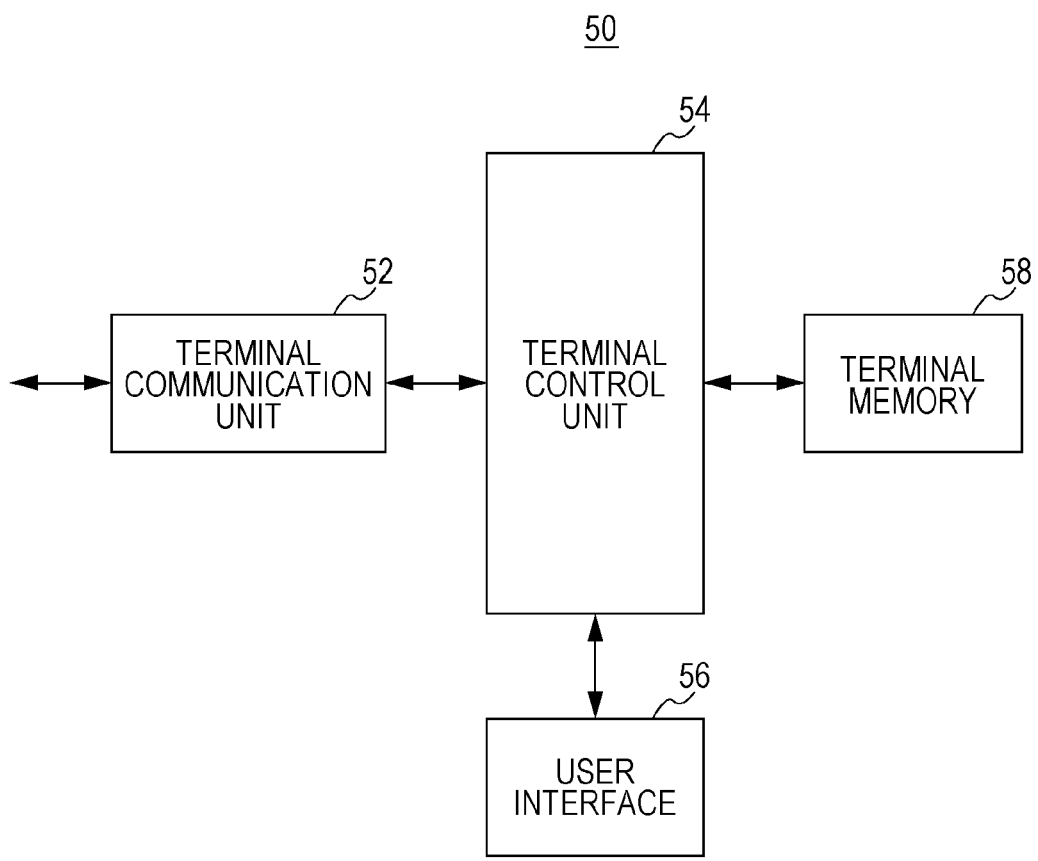
FIG. 17 is a diagram illustrating a configuration example in a mobile terminal or a PC terminal in FIG. 1.

Next, a configuration on the user terminal side will be explained by using FIG. 17. FIG. 17 is a diagram illustrating a configuration example in the mobile terminal 50 or the PC terminal 70 in FIG. 1. Here, for convenience of explanation, a configuration of the mobile terminal 50 will be explained, but the PC terminal 70 may also have the same configuration.

The mobile terminal 50 includes a terminal communication unit 52, a terminal control unit 54, a user interface 56, and a terminal memory 58. The terminal communication unit 52 receives an app downloaded from the server device 10, and various information transmitted from the server device 10.

The terminal control unit 54 receives an instruction from a user through the user interface 56, and controls installation of an app and an API of a social game while accessing the terminal memory 58.

The user interface 56 includes a screen interface for displaying various screens such as a message to a user and a social game matching room screen, an input interface that receives an input from a user, such as a keyboard and a touch panel, and an image photographing member such as a camera.

The user interface 56 receives: selection of a quest from a user, which is a team battle participation request; various comment inputs; action button manipulation; and others, and then transmits these to the terminal control unit 54.

When an app game has been downloaded from an app providing platform, the terminal memory 58 is used for storing the downloaded app program. In case of a browser game, the terminal memory 58 is also used as a cash memory, for temporarily storing image data, and so on.

Hereinafter, a general operation of a user terminal, assuming a browser game, will be explained as an example of an operation when the user A makes a participation request to a team battle.

When the user A starts up a web browser and selects a social game site, the terminal control unit 54 communicates with the server device 10 through use of the terminal communication unit 52 to receive data of the selected social game in a format of operating on the web browser and execute the data.

Although a guide for a login procedure to a social game is displayed on the user interface 56 in some cases, explanation for such a case is omitted for simplification here, and explanation will be made assuming that a social game has been started.

The first screen display example 610, illustrated in FIG. 6, is displayed on the user interface 56, and the user A performs input manipulation to the hunt button 306. The terminal control unit 54 communicates with the server device 10 through use of the terminal communication unit 52 to download the quest selection screen 307 illustrated in FIG. 7. Then, the terminal control unit 54 allows the downloaded screen to be stored in the terminal memory 58, and the quest selection screen 307 to be displayed on the user interface 56.

Next, the user A performs input manipulation to the quest selection button 309. The terminal control unit 54 communicates with the server device 10 through use of the terminal communication unit 52 to transmit information that the quest selection button 309 has been input, which is a participation request to a team battle, to the server device 10, and to download from the server device 10 the menu image 310 illustrated in FIG. 10. Then, the terminal control unit 54 allows the downloaded menu image 310 to be stored in the terminal memory 58, and the downloaded menu image 310 to be displayed on the user interface 56.

Next, the user A performs comment input manipulation to the comment input column 312, and then input manipulation to the member selection button 311. The terminal control unit 54 communicates with the server device 10 through use of the terminal communication unit 52 to transmit the comment information and member selection information input to the server device 10, and to download from the server device 10 the matching room image 402 illustrated in FIG. 8. Then, the terminal control unit 54 allows the downloaded matching room image 402 to be stored in the terminal memory 58, and the matching room image 402 to be displayed on the user interface 56.

Here, even when other users having selected the same quest exist in a stage of having received a participation request to a team battle from a terminal of the user A when generating the matching room image 402, the server device 10 transmits the information to the user terminal such that other users' information is not contained in the matching room image 402.

Next, the matching room image 402 is displayed, and the user A performs input manipulation to the search button 314. The terminal control unit 54 communicates with the server device 10 through use of the terminal communication unit 52 to download from the server device 10, for example, image tailored to a mission game corresponding to the search button 314. Then, the terminal control unit 54 allows the downloaded screen to be stored in the terminal memory 58, and the image tailored to a mission game to be displayed on the user interface 56.

Next, when there exist information of other users having made a participation request to the same quest to the server device 10 in a state that the user A is displayed in the matching room image 402, the server device 10 may transmit the information to the user terminal such that other user's information is contained together with the user A in the matching room image 402 as illustrated in FIG. 9 when generating the matching room image 402.

Next, the terminal control unit 54 communicates with the server device 10 through use of the terminal communication unit 52 to download from the server device 10 the matching room image 402 illustrated in FIG. 9. Then, the terminal control unit 54 allows the downloaded matching room image 402 to be stored in the terminal memory 58, and the matching room image 402 to be displayed on the user interface 56.

Next, on lapse of the reception time of a participation request to a team battle, the server device 10 transmits to the user terminal the opponent character image 501 and the battle image 502 containing information of users participating in the team battle.

Next, the terminal control unit 54 communicates with the server device 10 through use of the terminal communication unit 52 to download from the server device 10 the opponent character image 501 illustrated in FIG. 12. Then, the terminal control unit 54 allows the downloaded opponent character image 501 to be stored in the terminal memory 58, and the opponent character image 501 to be displayed on the user interface 56.

Next, when the user A performs input manipulation to the attack button 503, information that an attack is performed is transmitted to the server device 10, and then battle processing progresses in the server device 10. Thereafter, an operation is repeated based on the manipulation of the user A until a battle is terminated, and the server device 10 transmits to a user terminal an image of the opponent character image 501 and the battle image 502 containing an HP consumption of the opponent character.

Figure 18:
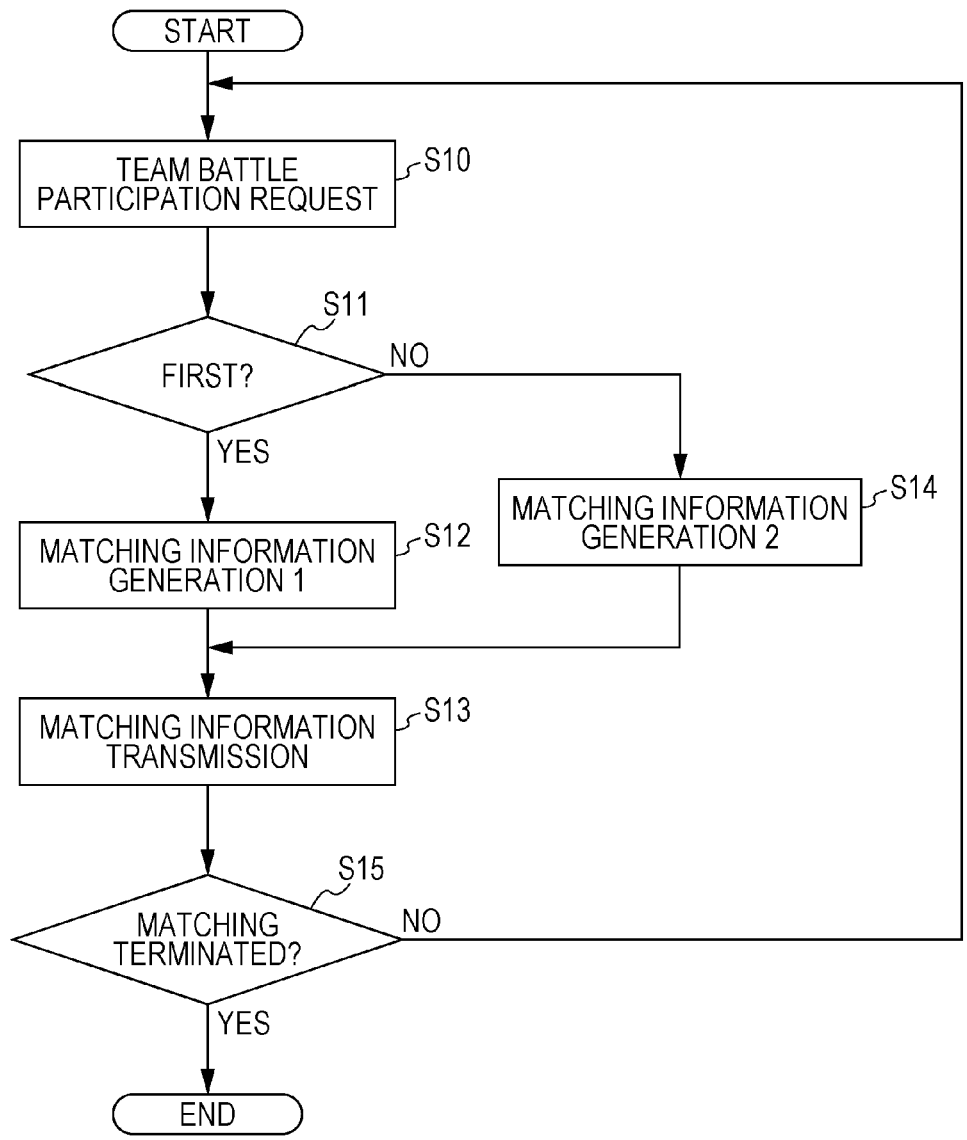
FIG. 18 is a flowchart illustrating a processing procedure example of a matching processing unit in FIG. 2.

FIG. 18 is a flowchart illustrating a processing procedure example of the matching processing unit 15 in FIG. 2. This flowchart may be stared at a timing when manipulation of initiating a social game has been performed from a user terminal.

First, the matching processing unit 15 receives a participation request to a team battle made by the user A and other users, from a user terminal through the server communication unit 12 (S10). The participation request is made, as previously described, by manipulation of the quest selection buttons 309. When a participation request is made, the participation request is stored to the server memory 17 together with user information and terminal information.

Here, determination is made on whether or not the matching information or the matching room image in this quest is transmitted to the user A having made the participation request received for the first time, based on the record in the server memory 17. When it is transmitted for the first time (Yes in S11), matching information is generated without containing information of other users (S12). On the other hand, when it is not transmitted for the first time (No in S11), matching information is generated in such a manner as containing information of, for example, the user having made a participation request firstly among other users having made a participation request to a team battle (S14). At this time, users having high affinity with the user A may be extracted from other users having made a participation request to a team battle, using past history information which allows to consult the correlation among the users, so that matching information is generated in such a manner as containing information of one user among the extracted users.

Next, the generated matching information is transmitted to the user terminal of the user A (S13). Here, alternatively, the matching room image can be generated based on the matching information, and transmitted to a user terminal, as described above.

Lastly, the matching processing unit 15 determines whether or not the matching is to be terminated, for example, whether or not the matching time has lapsed, or whether or not the number of participants to the team battle has reached an upper limit When it is to be terminated (Yes in S15), the processing is terminated. When it is not to be terminated (No in S15), the processing of repeating the flow until the termination conditions are satisfied is performed.

Figure 19:
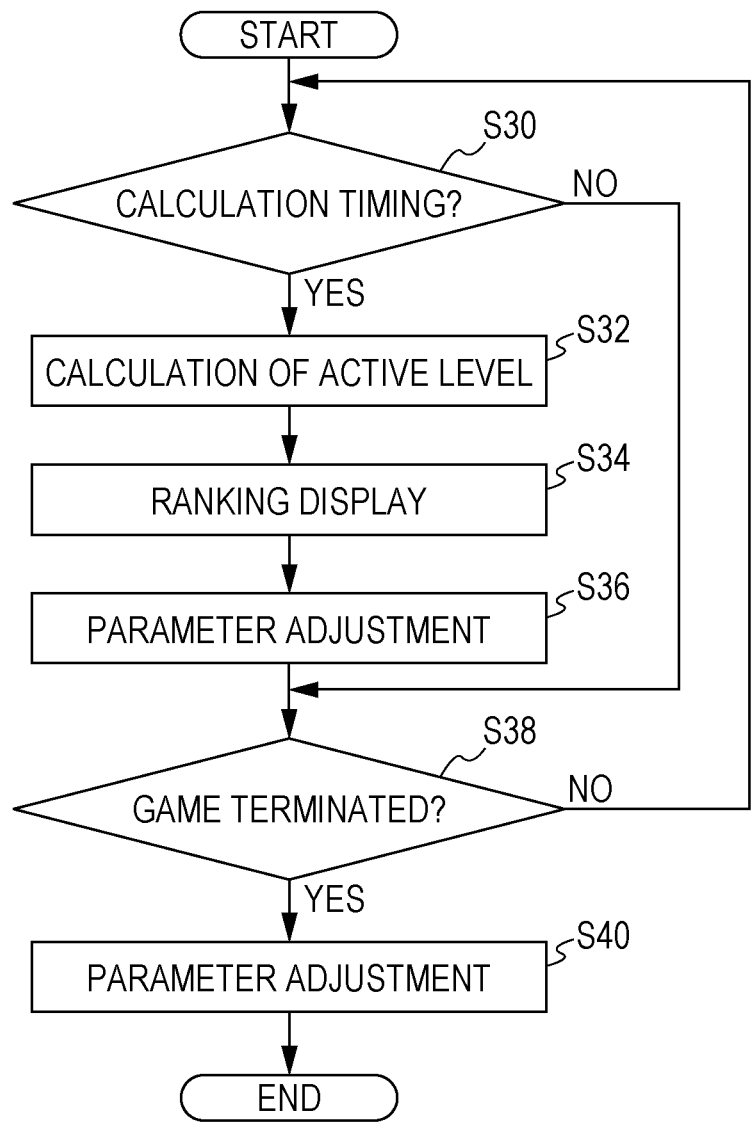
FIG. 19 is a flowchart illustrating a processing procedure example of the game management unit in FIG. 2.

FIG. 19 is a flowchart illustrating a processing procedure example of the game management unit 14 in FIG. 2. This flowchart may be started at a timing when the game is started by the game management unit.

First, the game management unit 14 checks whether or not the timing to calculate an active level has come (S30). When the timing has not come (No in S30), the processing moves to S38. On the other hand, when the calculation timing has come (Yes in S30), the game management unit 14 calculates an active level for each participating user (S32). Furthermore, the game management unit 14 performs ranking display in accordance with the calculated active level (S34). The game management unit 14 instructs the parameter adjustment unit 19 to adjust a parameter for each participating user in accordance with the active level for each participating user (S36), and allows to move to game termination determination processing (S38).

When the game is determined not to be terminated yet in the processing of S38 (No in S38), the flow returns to the processing of S30. On the other hand, when the game is determined to have been terminated (Yes in S38), the game management unit 14 allows the parameter adjustment unit 19 to adjust a parameter for each participating user in accordance with the ranking when the game is terminated (S40).

Explanation has been made corresponding to each aspect, and as described above, matching processing is performed so that the matching information indicating a team matching state or the matching image (the matching room image) displayed on a terminal side leads each user to feel that the each user himself or herself has participated in the team first. Accordingly, there can be obtained effects that independence of the user to a social game is significantly improved, promoting active participation of each user to this social game, so that the whole game becomes exciting and interesting.

In the above, embodiments according to the present invention has been explained based on examples. The present invention is not limited to the above-described examples and contents thereof, and can be variously modified and practiced within the range of the gist of the present invention. The above-described examples are provided for illustrative purposes. It is understood by persons skilled in the art that various variations are possible in a combination of each constituent and each processing process in the examples, and such variations are also within the scope of the present invention.

What is claimed is:

1. A server device comprising:
  a game management unit that manages progress of a network game in which a plurality of users are allowed to simultaneously participate through communication lines across a plurality of terminals;
  a ranking processing unit that calculates a contribution degree to the network game as an active level for each participating user during progress of the network game managed by the game management unit and determines a ranking; and
  a display configured to display a participating user from the plurality of users in accordance with the ranking determined by the ranking processing unit;
  wherein the game management unit comprises:
    a receiving unit that, in a team formed by users having collaborative relationships with each other among users participating in the network game, receives an instruction action for the same objective from a user belonging to the team for a predetermined limited time; and
    an excitement level processing unit that calculates an excitement level based on a total amount of the instruction actions from each user within the same team, the instruction actions having been received by the receiving unit through the plurality of terminals, and
    the game management unit allows the network game to progress in accordance with the excitement level calculated by the excitement level processing unit.

2. The server device according to claim 1, wherein the ranking processing unit determines the ranking at a periodical or predetermined timing, as the network game progresses.

3. The server device according to claim 2, comprising a parameter adjustment unit that adjusts a parameter for each participating user in accordance with the ranking determined during progress of the network game so as to be advantageous in the network game in progress.

4. The server device according to claim 3, wherein the parameter adjustment unit adjusts the parameter so that when the ranking during progress of the network game is lower, the network game progresses more advantageously.

5. The server device according to claim 1, wherein the ranking processing unit calculates the active level based on at least one of the number of predetermined instructions from a user to the network game, or a degree of an action having promoted the progress of the game.

6. The server device according to claim 1, wherein the display control unit allows the total amount of the instruction actions received by the receiving unit for a predetermined limited time to be displayed for each user.

7. A non-transitory computer-readable storage medium storing game program causing a computer to execute:
  managing progress of a network game in which a plurality of users are allowed to simultaneously participate through communication lines across a plurality of terminals;
  calculating a contribution degree to the network game as an active level for each participating user during progress of the network game and determining a ranking; and
  displaying a participating user from the plurality of users in accordance with the determined ranking;
  in a team formed by users having collaborative relationships with each other among users participating in the network game, receiving an instruction action for the same objective from a user belonging to the team for a predetermined limited time; and calculating an excitement level based on a total amount of the instruction actions from each user within the same team, the instruction actions having been received through the plurality of terminals, and facilitating the network game to progress in accordance with the calculated excitement level.

* * * * *